United States Patent [19]
Chang et al.

[11] Patent Number: 5,948,279
[45] Date of Patent: Sep. 7, 1999

[54] METHOD AND APPARATUS FOR CONTROLLING MACROFOULERS IN ON-DEMAND WATER CONDUITS

[75] Inventors: Tiao J. Chang; Timothy A. Bartrand, both of Athens, Ohio

[73] Assignee: Ohio University, Athens, Ohio

[21] Appl. No.: 08/937,541

[22] Filed: Sep. 25, 1997

[51] Int. Cl.[6] .............................. B01D 19/00; C02F 1/20
[52] U.S. Cl. ..................... 210/808; 210/750; 210/764; 95/260; 95/266; 96/194
[58] Field of Search ............................. 210/98, 188, 750, 210/808; 134/21, 22.11, 22.12, 169 C; 422/6, 33; 95/260, 266; 96/194

[56] References Cited

U.S. PATENT DOCUMENTS

| | | | |
|---|---|---|---|
| 3,206,917 | 9/1965 | Kaiser et al. | 95/266 |
| 4,443,232 | 4/1984 | Kaiser | 95/266 |
| 4,579,665 | 4/1986 | Davis et al. | 210/755 |
| 4,816,163 | 3/1989 | Lyons et al. | 210/698 |
| 4,857,209 | 8/1989 | Lyons et al. | 210/755 |
| 4,970,239 | 11/1990 | Whitekettle et al. | 514/665 |
| 5,008,075 | 4/1991 | Rufolo | 422/6 |
| 5,015,395 | 5/1991 | Muia et al. | 210/755 |
| 5,040,487 | 8/1991 | Bollyky et al. | 119/4 |
| 5,062,967 | 11/1991 | Muia et al. | 210/755 |
| 5,069,722 | 12/1991 | Murphy | 134/22.11 |
| 5,141,754 | 8/1992 | Ekis, Jr. et al. | 424/661 |
| 5,148,777 | 9/1992 | Brockhurst | 123/41.15 |
| 5,160,047 | 11/1992 | McCarthy | 210/749 |
| 5,186,841 | 2/1993 | Schick | 210/760 |
| 5,193,482 | 3/1993 | McLaughlin | 119/4 |
| 5,209,934 | 5/1993 | Ekis, Jr. et al. | 424/661 |
| 5,253,954 | 10/1993 | Landsberger | 405/127 |
| 5,294,351 | 3/1994 | Clum et al. | 210/774 |
| 5,346,598 | 9/1994 | Riffe et al. | 204/147 |
| 5,376,282 | 12/1994 | Chang | 210/750 |
| 5,403,217 | 4/1995 | Vosper | 440/49 |
| 5,424,032 | 6/1995 | Christensen et al. | 422/14 |
| 5,432,756 | 7/1995 | Bryden | 367/139 |
| 5,520,810 | 5/1996 | Goudy, Jr. et al. | 210/602 |
| 5,543,056 | 8/1996 | Murcott et al. | 210/705 |
| 5,578,116 | 11/1996 | Chang | 96/194 |
| 5,639,843 | 6/1997 | Babirad et al. | 528/9 |
| 5,643,424 | 7/1997 | Riffe et al. | 204/196 |

OTHER PUBLICATIONS

Mortin B., "The Aquatic Nuisance Species Problem: A Global Perspective and Review", *Zebra Mussels and Aquatic Nuisance Species*, Ann Arbor Press, 1997.

*Primary Examiner*—Jay H. Woo
*Assistant Examiner*—Frank Lawrence
*Attorney, Agent, or Firm*—Standley & Gilcrest LLP

[57] ABSTRACT

In general terms, the present invention includes an apparatus for controlling macrofoulers and larvae thereof in an on-demand water conduit, and a method for controlling macrofoulers and larvae thereof in a water conduit having an intake opening. The apparatus comprises generally: a water conduit having an intake opening, the water conduit adapted to conduct a flow of water on demand; and a vacuum device adapted to receive water, the vacuum device adapted to produce oxygen-depleted water from the received water, the vacuum device also adapted to provide a flow of the oxygen-depleted water to the water conduit when no demand exists for a flow of water through the water conduit. The invention also includes a method for controlling macrofoulers and larvae thereof in a water conduit having an intake opening, such as through use of the apparatus of the present invention.

21 Claims, 14 Drawing Sheets

FIELD SITE
DISSOLVED OXYGEN
MEASUREMENT LOCATION

WATER

METHOD AND APPARATUS FOR CONTROLLING MACROFOULERS IN ON-DEMAND WATER CONDUITS

BACKGROUND OF THE INVENTION

On a daily basis, vast quantities of water are removed from rivers, lakes, and streams for industrial and commercial uses. For such uses, water conduits may be required to conduct large amounts of water on demand. In particular, the fire protection piping systems of power plants, locks, dams, and other related facilities may be required to conduct large amounts of water on demand when there is an emergency.

The water sources for many of these on-demand water conduits support an abundance of biological life forms. Some of the biological life forms cannot be removed before the water is demanded for industrial or commercial use. While some of these biological life forms may not adversely affect on-demand water systems, macrofoulers such as zebra mussels have had a severe impact.

An on-demand water conduit may be idle when no demand exists for a flow of water. For instance, the intake water conduits of fire protection piping systems may be idle when there is no emergency. Consequently, on-demand water conduits are particularly susceptible to infestation by macrofouling organisms such as zebra mussels when there is no demand for a flow of water.

Infestation of on-demand water conduits by macrofouling organisms such as zebra mussels is a serious and growing problem for two main reasons. Such macrofouling organisms diminish the water carrying capacity of an on-demand water conduit by reducing the effective bore and increasing the roughness of the conduit. In addition, such macrofouling organisms may set up local differences in the state of oxidation on the inner surface of a steel or cast-iron on-demand water conduit which may cause electro-corrosion. These consequences of macrofouling organisms are responsible for much waste in on-demand water systems including increased pumping costs, loss of water carrying capacity, and increased costs for the cleaning, maintenance, and replacement of fouled conduits.

Macrofoulers include any oxygen-dependent organism, sessile or non-sessile, whose presence in a body of water fouls the condition of a structure in the body of water, such as a conduit. The three most common macrofouling organisms in the United States are currently the zebra mussel, the quagga mussel, and the asiatic clam. All of these organisms are dependent on dissolved oxygen for respiration and are, thus, amenable to control by the proposed invention. Other species that are known macrofouling organisms amenable to control by the present invention are *Mytilopsis sallei* (found in the Gulf of Mexico and Brazil), *Musculista senhousia* (found in China, Siberia, and adjacent areas), *Limnopema fortunei* (found in China's fresh waters), and *Modiolus striatulus* (found in the intake of a potable water system in India). The preceding list is not an exhaustive list of macrofouling organisms amenable to control by the present invention. The transport of organisms between bodies of water and the evolution of new species results in continuous supply of new macrofouling organisms.

Zebra mussels, in particular, attach themselves to water conduits by up to 200 tough threads of a dry horny material called the byssus. Zebra mussels also use these byssal threads to attach themselves to other zebra mussels. Consequently, zebra mussels may form layers more than one inch thick on the interior of water conduits, or they may even form clusters in open water.

Zebra mussels were unknown in the Great Lakes until 1988 when substantial infestations were discovered in southeastern Lake St. Clair. Presumably, the zebra mussels were introduced by ballast water discharged by the tanks of an international shipping boat in 1986. Zebra mussels have since spread throughout Lake Erie with phenomenal speed, and their presence in Lake Michigan near Green Bay, Wis. and Gary, Ind. imply that it is only a matter of time before all of the Great Lakes, the Mississippi River, and the Ohio River are effected. With time, the problem may even extend to every body of surface water in North America. As a result, a wide variety of methods have since been used in an attempt to control infestation by zebra mussels.

Scraping has been used to remove existing growth of zebra mussels from mains, tanks, and conduits. This method is slow and expensive, and it cannot remove every zebra mussel from the mains, tanks, or conduits. Moreover, the mains, tanks, or conduits cannot be in service during the scraping treatment.

High pressure water has also been used for removing zebra mussels from walls, trash racks, and other equipment. An example of such a mechanical cleaning device is taught in U.S. Pat. No. 5,069,722. For this treatment, a suction pump is normally attached to a mechanical scrapper which can be used to dislodge and vacuum the zebra mussels out of an area. This method, of course, requires the operation and maintenance of the equipment by a work force. In addition, this method may not work for water conduits that have a small diameter.

Another method which has been used for controlling zebra mussels is the application of toxic and non-toxic coated materials which can either prevent zebra mussel settlement or cause very weak byssal attachment. These materials include silicone and epoxy compounds, copper-based paints, and thermal metallic sprays. Such materials can be used on structures that are difficult to clean, or if there are anticipated difficulties with removal and disposal of large numbers of zebra mussels. However, some of the drawbacks of the use of such materials include the expense of the materials, the expense of applying the materials, and the possibility that the materials may render the water inappropriate for some end uses.

Many oxidizing and non-oxidizing chemical control agents have also been used to reduce or eliminate zebra mussels. Chlorine is a commonly used control agent in Europe, the U.S., and Canada, and it can be used in pipes or ducts that contain pressure sensing or other equipment. Continuous exposure to chlorine at 0.5 mg/L will kill zebra mussels in 14 to 21 days. Chlorine, however, is toxic to humans and animals, and it produces undesirable, even carcinogenic, chlorinated organic compounds in the water. Moreover, chlorine corrodes the operating equipment.

A wide variety of other chemical agents have been used in an attempt to control infestation by zebra mussels. These include the use of a nitrostyrene compound and an alkyl thiocyanate compound as taught in U.S. Pat. No. 4,579,665; the use of a water-soluble alkyl guanidine salt as taught in U.S. Pat. No. 4,816,163; the use of a water-soluble quaternary ammonium salt, such as those taught in U.S. Pat. No. 4,857,209; the use of an alkylthioalkylamine or acid addition salt thereof, such as that taught in U.S. Pat. No. 4,970,239; the use of a water-soluble dialkyl diallyl quaternary ammonium polymer (polyquat), such as that taught in U.S. Pat. No. 5,015,395; the use of an effective amount of ozone, such as that taught in U.S. Pat. No. 5,040,487; the use of didecyl dimethyl ammonium halide such as taught in U.S. Pat. No.

5,062,967; the use of a combination of a chlorine solution and a bromide salt capable of releasing bromide ions, such as taught in U.S. Pat. No. 5,141,754; and the use of a glutaraldehyde, such as taught in U.S. Pat. No. 5,160,047.

Chemical methods such as those described above have the obvious disadvantages of requiring the purchase of expensive chemicals as well as the need to use skilled operators in their application. Such chemical methods also have a toxic and polluting effect that may be inappropriate for the end use. Furthermore, such chemical methods cannot be effectively used in an on-demand water conduit.

On the other hand, thermal processes have been demonstrated to be a successful control technology. The post veliger and settling larvae of zebra mussels are the most sensitive to temperature shock and anoxia. It has been shown that zebra mussels acclimated to a water temperature between 5 degrees Celsius and 15 degrees Celsius would go into thermal shock when the water temperature reached approximately 30 degrees Celsius, and it has been shown that zebra mussels acclimated to a water temperature of 25 degrees Celsius would go into thermal shock when the water temperature reached approximately 35 degrees Celsius. Thermal processes, however, may have ecological impacts on other aquatic life.

Dissolved oxygen is essential for zebra mussels especially at the stage of their settling on hard substrata. As taught in U.S. Pat. No. 5,578,116, oxygen deprivation is a control technique for removing zebra mussels from water conduits. The present invention is an improvement over U.S. Pat. No. 5,578,116, and the disclosure of U.S. Pat. No. 5,578,116 is hereby incorporated by reference. U.S. Pat. No. 5,578,116 provides a mechanical method for controlling zebra mussels which may be applied to a flow of water. Consequently, the method of U.S. Pat. No. 5,578,116 is not readily applicable to an on-demand water conduit.

Accordingly, it is an object of the present invention to provide a method and apparatus for controlling macrofoulers and the larvae thereof in an on-demand water conduit, such as an emergency water conduit and its associated intake structures. It is also desirable to be able to develop a method and apparatus which can be implemented without the use of skilled operators or workmen. In view of the present disclosure and the practice of the present invention, other advantages of the present invention may become apparent.

SUMMARY OF THE INVENTION

In general terms, the present invention includes an apparatus for controlling macrofoulers and larvae thereof in an on-demand water conduit and/or at its intake opening, and a method for controlling macrofoulers and larvae thereof in a water conduit having an intake opening.

The apparatus for controlling macrofoulers and larvae thereof in an on-demand water conduit comprises generally: a water conduit having an intake opening, the water conduit adapted to conduct a flow of water on demand; and a vacuum device adapted to receive water, the vacuum device adapted to produce oxygen-depleted water from the received water, the vacuum device also adapted to provide a flow of the oxygen-depleted water to the water conduit when no demand exists for a flow of water through the water conduit.

It is preferred that the water conduit be adapted to conduct a flow of water, on demand, in a first direction and that the vacuum device be adapted to provide a flow of the oxygen-depleted water to the water conduit in a direction opposite the first direction when no demand exists for water in the first direction.

The apparatus of the present invention may further include: an uptake conduit adapted to transfer a flow of water from the water conduit to the vacuum device, whereby the vacuum device produces oxygen-depleted water from the flow of water that was transferred by the uptake conduit.

The apparatus may preferably include a flow control mechanism to shut off, on demand, the flow of water in the uptake conduit.

The flow of water in the uptake conduit thus may include the oxygen-depleted water that flowed through the water conduit.

The vacuum device may receive water from a source external to the water conduit.

It is preferred that the apparatus further comprise a flushing conduit adapted to accept a flow of the oxygen-depleted water from the vacuum device, the flushing conduit also adapted to provide the intake opening of the water conduit with a flow of the oxygen-depleted water.

It is also preferred that the vacuum chamber is maintained with water to about 65% of its total volume.

As used herein, it will be understood that reference to oxygen-depleted water is intended to be to water having a concentration of dissolved oxygen that is below a level sufficient to support the survival of macrofoulers and the larvae thereof. Typically, the pressure of the vacuum device is kept above about 21 inches of mercury when there is no demand for water in the first direction. Preferably, the vacuum device reduces the concentration of dissolved oxygen in the oxygen-depleted water to less than about 50%.

The apparatus of the present invention also includes an apparatus for controlling macrofoulers and the larvae thereof in an on-demand water conduit, comprising: a water conduit having an intake opening, a first orifice, and a second orifice, the water conduit adapted to conduct a flow of water, on demand, in a first direction; and a vacuum device having an intake orifice, a discharge orifice, and a flushing orifice, the vacuum device adapted to receive water through the intake orifice, the vacuum device adapted to produce oxygen-depleted water from the water received through the intake orifice, the vacuum device adapted to provide a flow of the oxygen-depleted water through the discharge orifice to the second orifice of the water conduit when no demand exists for water in the first direction, the vacuum device also adapted to provide a flow of the oxygen-depleted water through the flushing orifice when no demand exists for water in the first direction; a flushing conduit adapted to accept a flow of the oxygen-depleted water from the flushing orifice of the vacuum device, the flushing conduit also adapted to provide the intake opening of the water conduit with a flow of the oxygen-depleted water; an uptake conduit adapted to transfer a flow of water from the first orifice of the water conduit to the intake orifice of the vacuum device; and a flow control mechanism to shut off, on demand, the flow of water in the uptake conduit; whereby, when no demand exists for water in the first direction, the vacuum device produces oxygen-depleted water that circulates through the second orifice of the water conduit, through the water conduit in direction opposite the first direction, through the first orifice of the water conduit, and then through the uptake conduit back to the intake orifice of the vacuum device.

The invention also includes a method for controlling macrofoulers and the larvae thereof in a water conduit having an intake opening, a first orifice, and a second orifice, the water conduit adapted to conduct a flow of water on demand, the method comprising the steps of: diverting the flow of water from the intake opening through the first orifice of the water conduit when no demand exists for a flow of water through the water conduit; subjecting the water that was diverted through the first orifice of the water conduit to a vacuum such that the concentration of dissolved oxygen in the water is reduced to a level that is insufficient to support the survival of macrofoulers and the larvae thereof; and circulating a flow of the water that was subjected to the vacuum through the second orifice of the water conduit and then through a desired section of the water conduit.

It is preferred that the method of the present invention is practiced using the invention in all its many embodiments as described above. In addition to the novel features and advantages mentioned above, other objects and advantages of the present invention will be readily apparent from the following descriptions of the drawings and preferred embodiments.

BRIEF DESCRIPTION OF THE DRAWINGS

FIG. 7(*b*) is a schematic diagram of a preferred embodiment of a high water level float check;

DETAILED DESCRIPTION OF PREFERRED EMBODIMENT(S)

Figure 1:
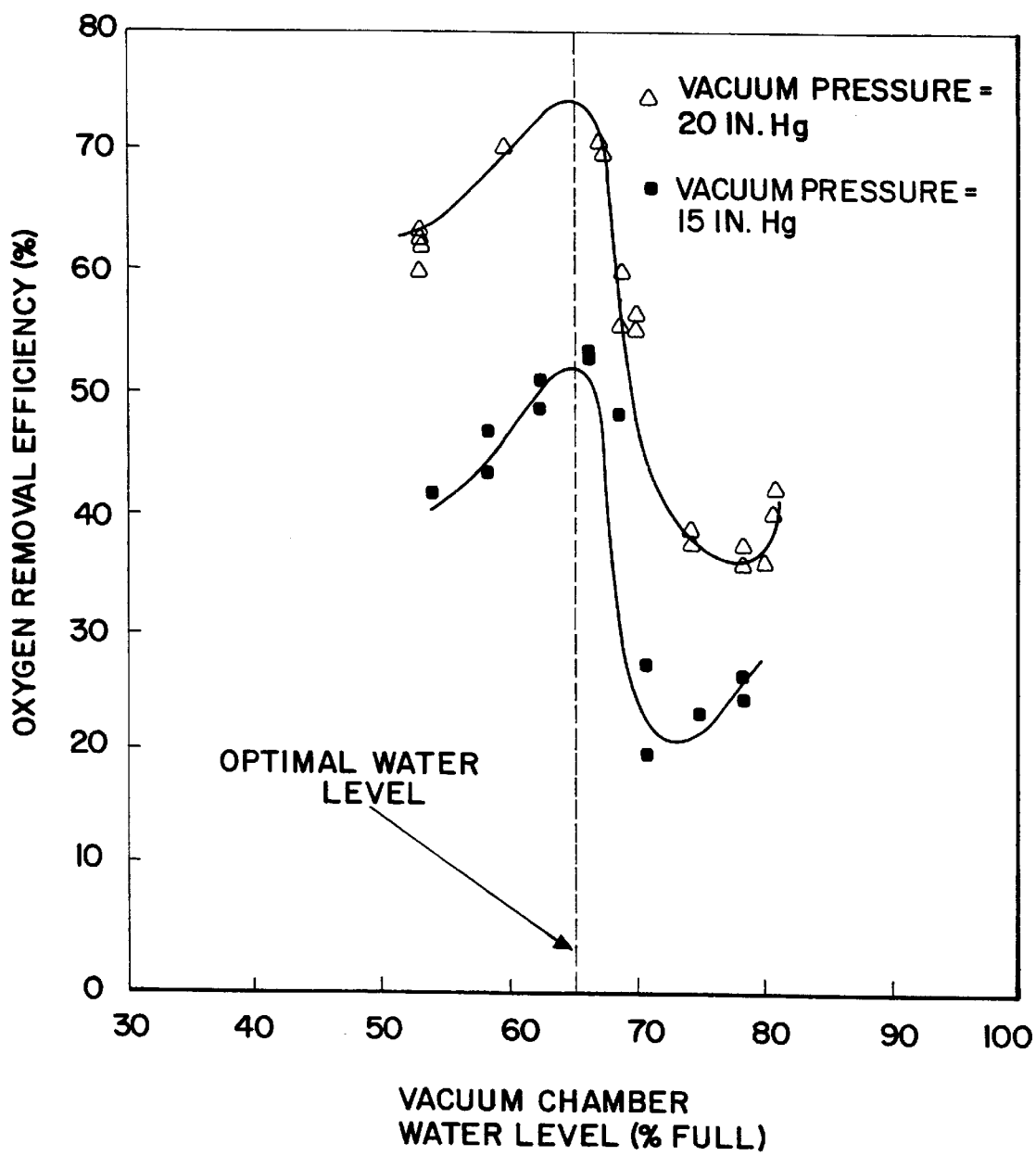
FIG. 1 is a graph of the oxygen removal efficiency versus vacuum chamber water level of a preferred embodiment of the present invention.
Figure 2:
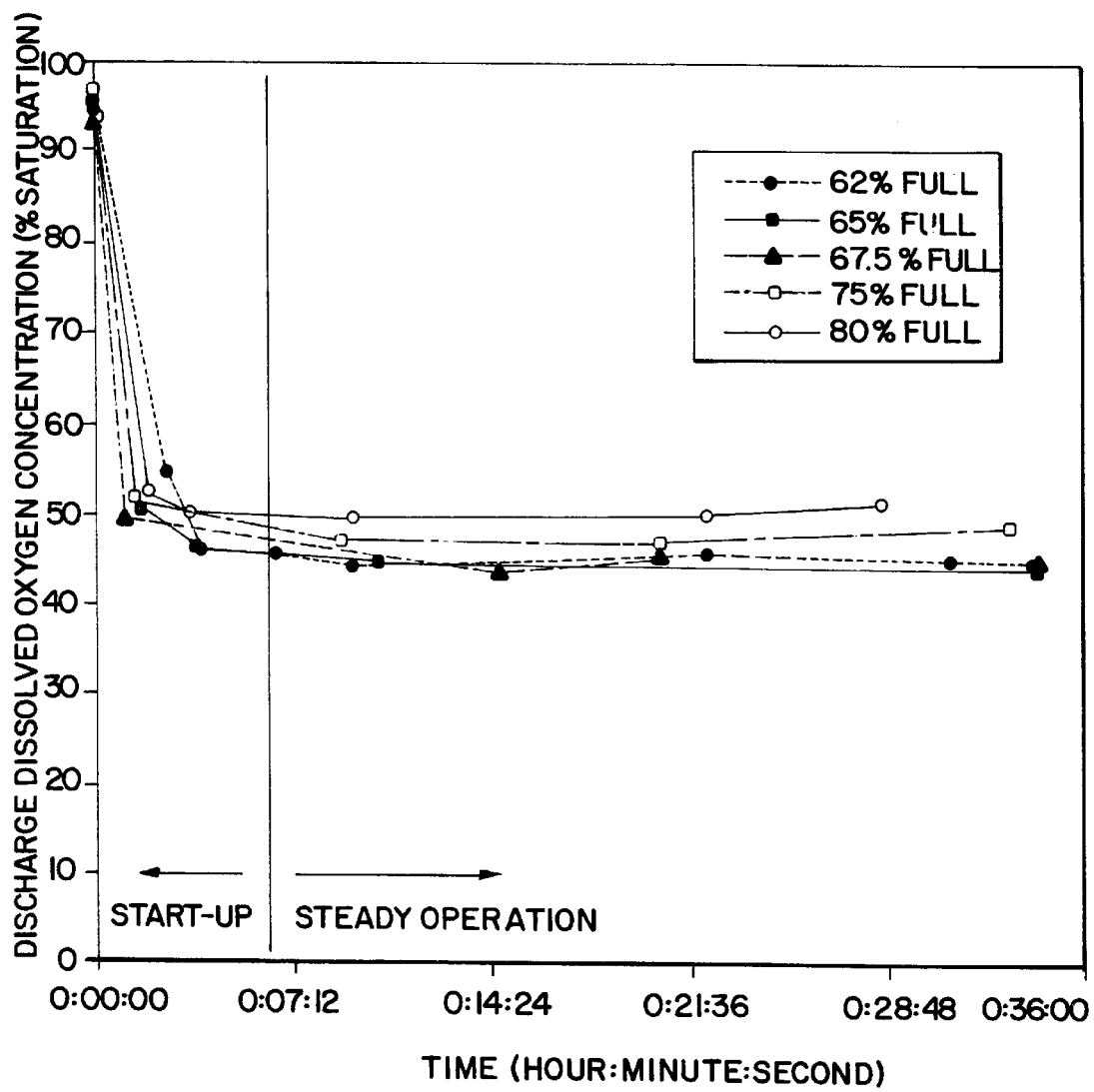
FIG. 2 is a graph of the dissolved oxygen concentration of discharged water versus time of a preferred embodiment of the present invention.

In accordance with the foregoing summary of the invention, the following describes preferred embodiments of the present invention which are presently considered to be the best mode.

The following describes some experimental and analytical work pertaining to the described embodiments of the present invention, including: (a) the design and operation of the apparatus in accordance with one embodiment of the present invention, (b) the testing procedures used in the field and in the laboratory, and (3) the analysis performed on experimental data.

Experimental Apparatus

Four constructions of the apparatus, designated A, B, C and D, have been operated. The constructions differ from each other mainly in the vacuum chamber size, intake and exhaust port sizes and control system. Three of the constructions (A, C, and D) were built for the laboratory, and the other one was built for testing in the field. The four constructions are summarized in Table 1. Only two constructions, B (the field version) and D (a laboratory version) are described in this section because the essential elements of the constructions are the same.

TABLE 1

Summary of Constructions

| Construction | Dimensions | Comments |
| --- | --- | --- |
| A | 1 Intake port<br>¼ inch (6.4 mm) diameter<br>located 75% height of tank<br>1 Discharge port<br>⅜ inch (9.5 mm) diameter<br>located 1/20 height of tank<br>Tank<br>17 inch (43.1 cm) diameter<br>24 inch (61.0 cm) height | First fully functional laboratory version of the apparatus.<br>Utilized external electronic eye sensor for control of intake stream via solenoid valve.<br>Damaged during attempt to drill larger discharge and intake ports.<br>Used ½ hp (0.35 kW) centrifugal discharge pump and ½ hp (0.35 kW) lobe type high vacuum pump, small positive displacement recirculation pump |
| B | 1 Intake port<br>¾ inch (19 mm) diameter<br>located 60% height of tank<br>1 Discharge port<br>1 inch (25 mm) diameter<br>located 1/20 height of tank<br>Tank<br>20 inch (51 cm) diameter<br>28 inch (71 cm) height | Field version<br><br>Uses 1 hp (0.7 kW) centrifugal discharge pump, 1 hp rotary vane vacuum pump and ½ hp centrifigal recirculation pump.<br>Internal sensor for water level control and float check in air line for checking water flow to vacuum pump |
| C | 2 Intake ports | Construction employs site glass for spray observation. |

TABLE 1-continued

Summary of Constructions

| Construction | Dimensions | Comments |
|---|---|---|
|  | 5/8 inch (16 mm) diameter located 75% height of tank 1 Discharge port ¾ inch (12.5 mm) diameter located 1/20 height of tank Tank 17 inch (43 cm) diameter 24 inch (61 cm) height | Uses 1 hp centrifugal discharge pump. No recirculation of water in vacuum chamber. Controls include low level float and relay system to detect power loss. |
| D | 2 Intake ports 1 inch (25 mm) diameter located 75% height of tank 2 Discharge ports 1.25 inch (32 mm) diameter located 1/20 height of tank Tank 17 inch (43 cm) diameter 24 inch (61 cm) height | Built for increased flow rates. Employs two solenoid valves operated from a single controller. Discharge pump is 1 ½ hp (1.1 kW) and no recirculation pump is used. Controls include low-level float and relay system to detect power loss. |

Apparatus Components

The major components of the vacuum device are: (1) a vacuum chamber; (2) water pump(s); (3) a vacuum pump; (4) optional water level control system; and (5) optional low and high-level water checks. Other components include pipes, conduits, hoses, fittings, and gauges. Following is a brief description of each component and the process through which each was selected.

A preferred embodiment of a vacuum chamber 1 (FIG. 3) is constructed of PVC pipe with welded reinforcement hoops 2 at both ends. There are 1 inch (2.5 cm) thick circular end pieces 3 welded to the tank's top and bottom. For intake ports (e.g., 4) and discharge ports (e.g., 5) of 1 inch diameter or less, the ports are drilled and tapped into PVC blocks 6 cemented to the tank's external surface. For ports with diameter greater than 1 in., the port is drilled into a PVC block and a threaded PVC adapter of appropriate size is cemented into the port hole. Fittings for vacuum line 7, sensor rods 8 and pressure gauge 11 are drilled and tapped into the tank top.

Figure 3:
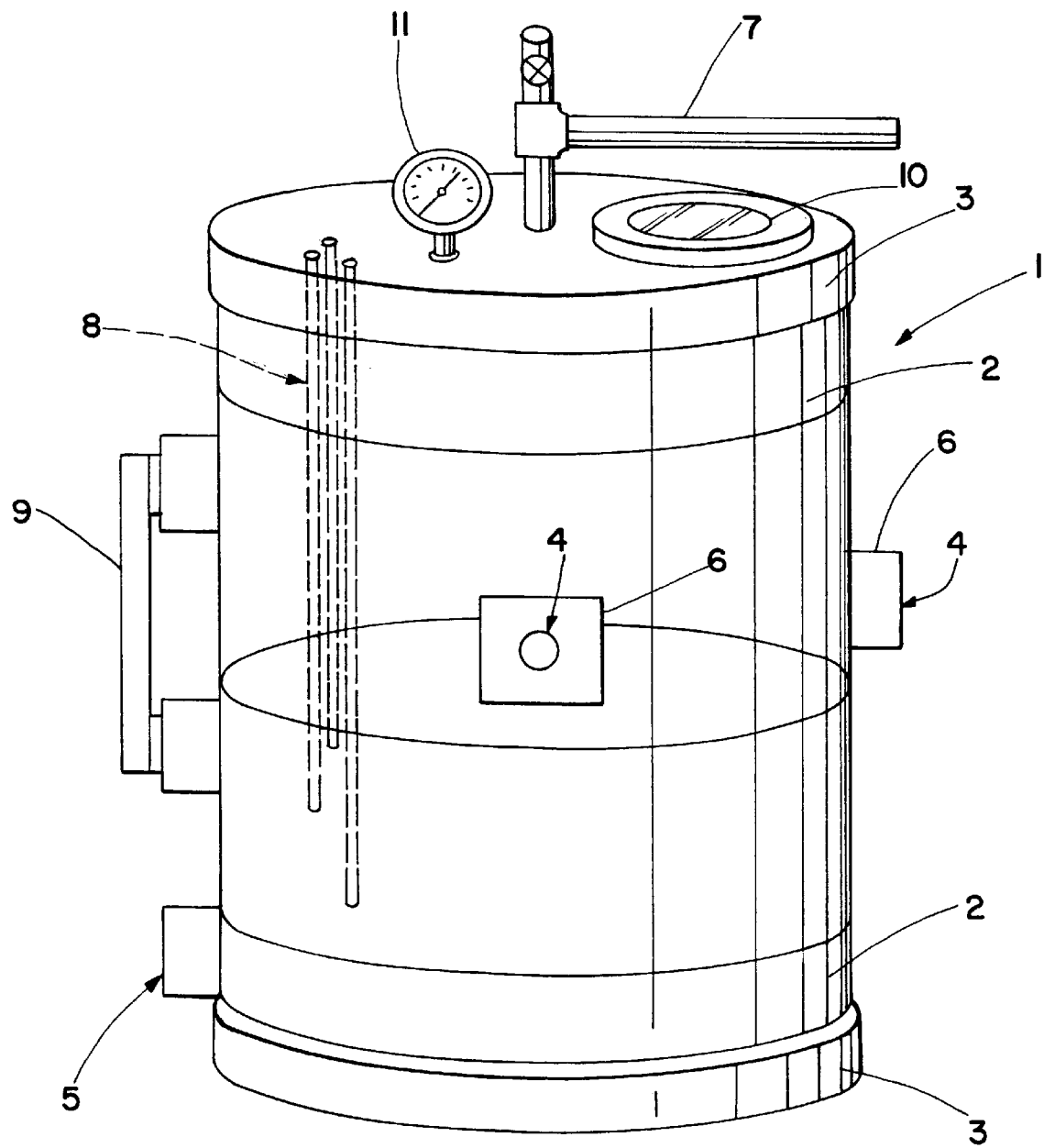
FIG. 3 is a schematic diagram of a preferred embodiment of a vacuum chamber and its associated structures.
Figure 4:
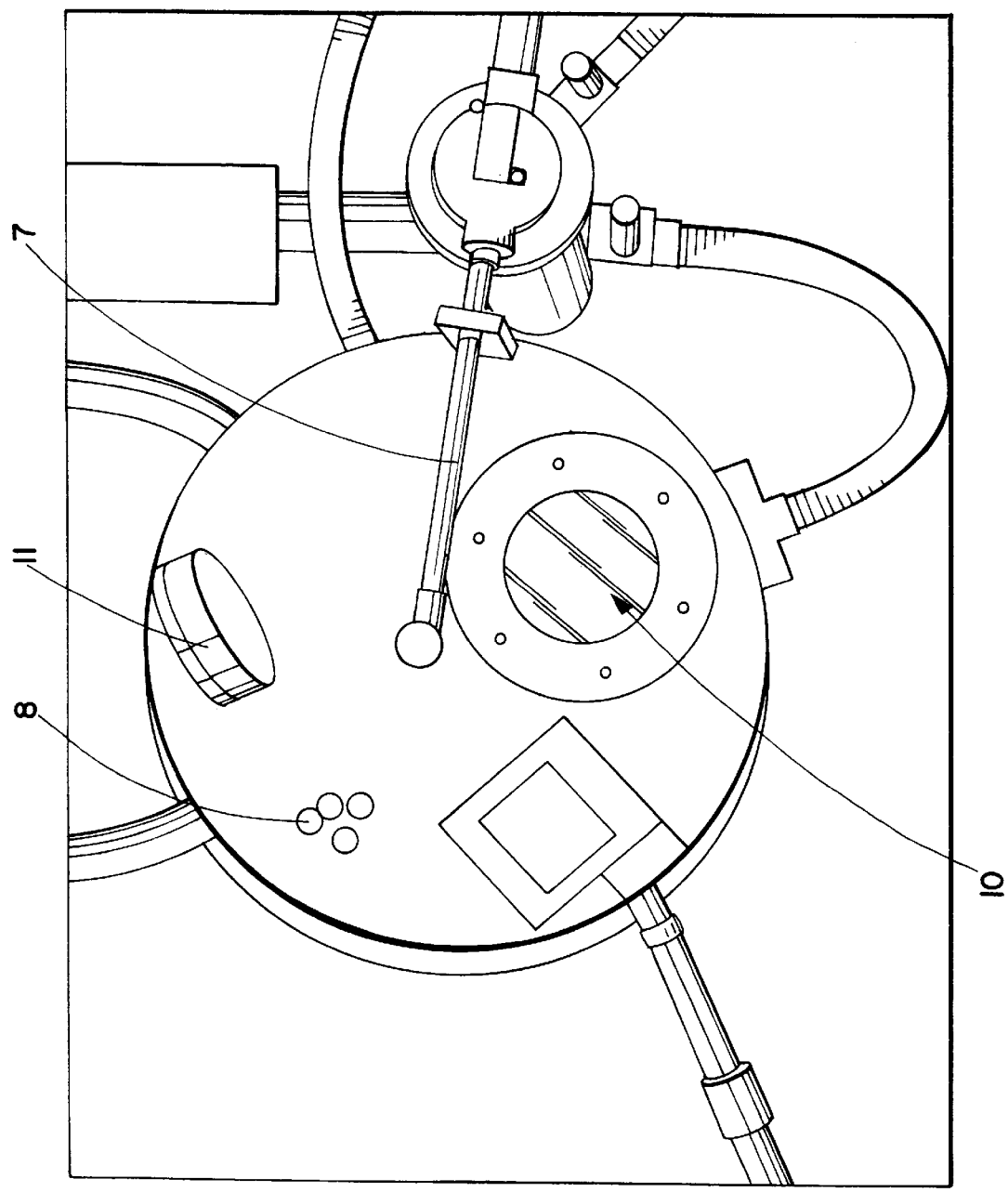
FIG. 4 is a schematic diagram of a preferred embodiment of the top of a vacuum chamber and its associated structures.

A photograph of the top of vacuum chamber 1 is shown in FIG. 4 which bears reference numerals corresponding to those described with respect to FIG. 3.

The vacuum chamber 1 may be fitted with at least one sight glass, such as sight glass 9. One sight glass 9 may be mounted on the side of the vacuum chamber 1 in a fashion similar to the ports and permits sighting of liquid level. The second sight glass 10 is drilled into the top of the vacuum chamber 1 and permits observation of the intake spray. The sight glass 10 in the top of the vacuum chamber 1 may be made of thick tempered glass and may held in place via a PVC collar bolted to the top of the vacuum chamber 1 and sealed on its under-surface by an O-ring. The spray site glass is sealed via the collar and ⅛ inch (3.2 cm) diameter rubber O-ring protruding from a groove machined into the top of the vacuum chamber 1.

Figure 5:
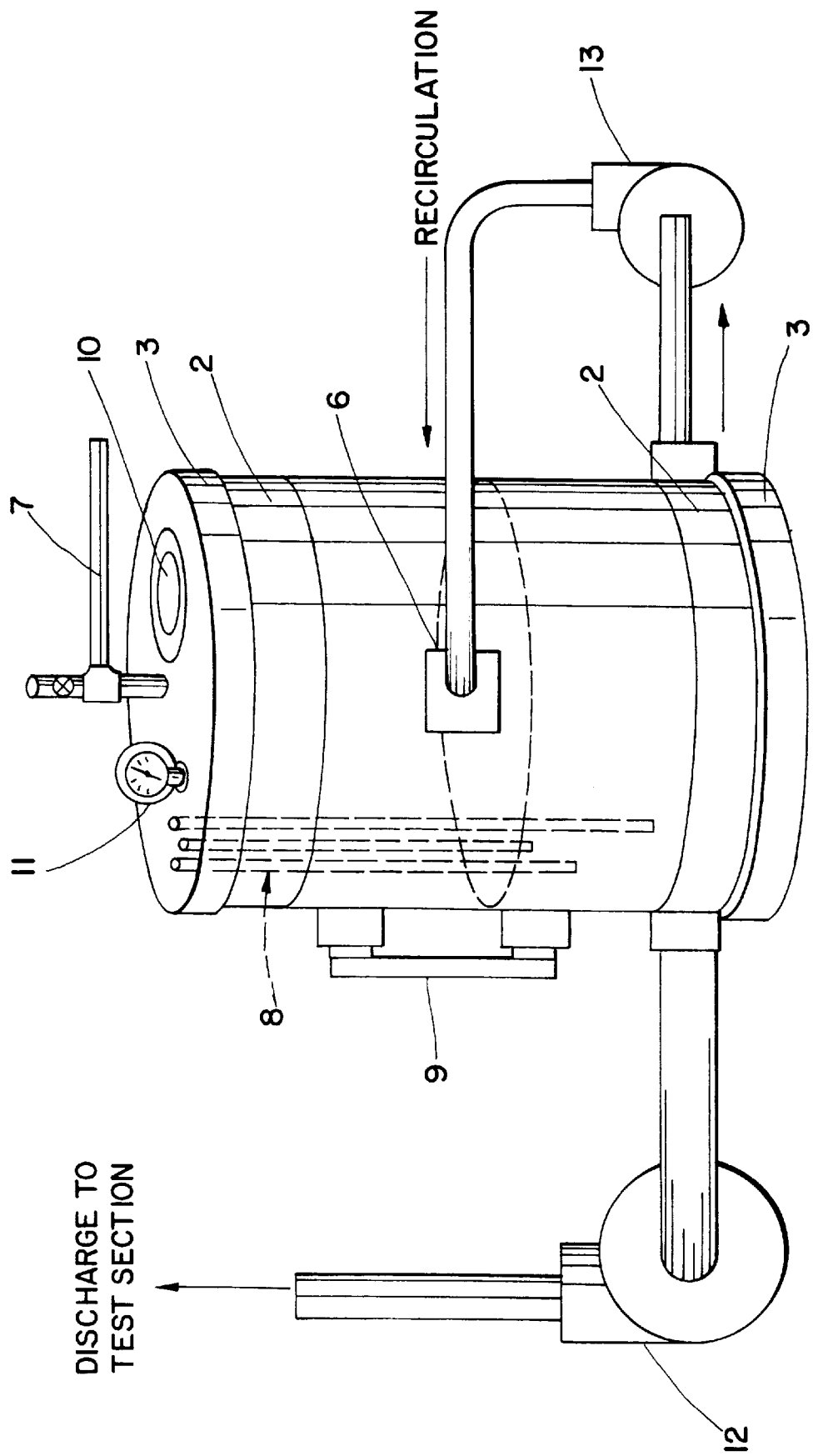
FIG. 5 is a schematic diagram of a preferred embodiment of a vacuum chamber and its associated structures, a discharge pump, and a recirculation pump.

The system may employ one or two water pumps (such as 12 and 13), as shown in FIG. 5. The pumps pull water from the vacuum chamber 1 into the test section (pump 12) or recirculate water within the vacuum chamber 1 (pump 13). Because the pumps must pull water against a substantial vacuum pressure and because a wide range of flow rates was desired, centrifugal pumps were chosen as water pumps. The disadvantages of using centrifugal pumps are that they are subject to cavitation at the pressure encountered in the system and that small leaks in the lines between the vacuum chamber 1 and the pump can cause the pumps to unprime. In the vacuum device, the pumps run at non-optimal operating conditions, so manufacturer pump data cannot be used to predict pump performance. As such, some experiment and experience may be used for water pump selection.

Figure 6:
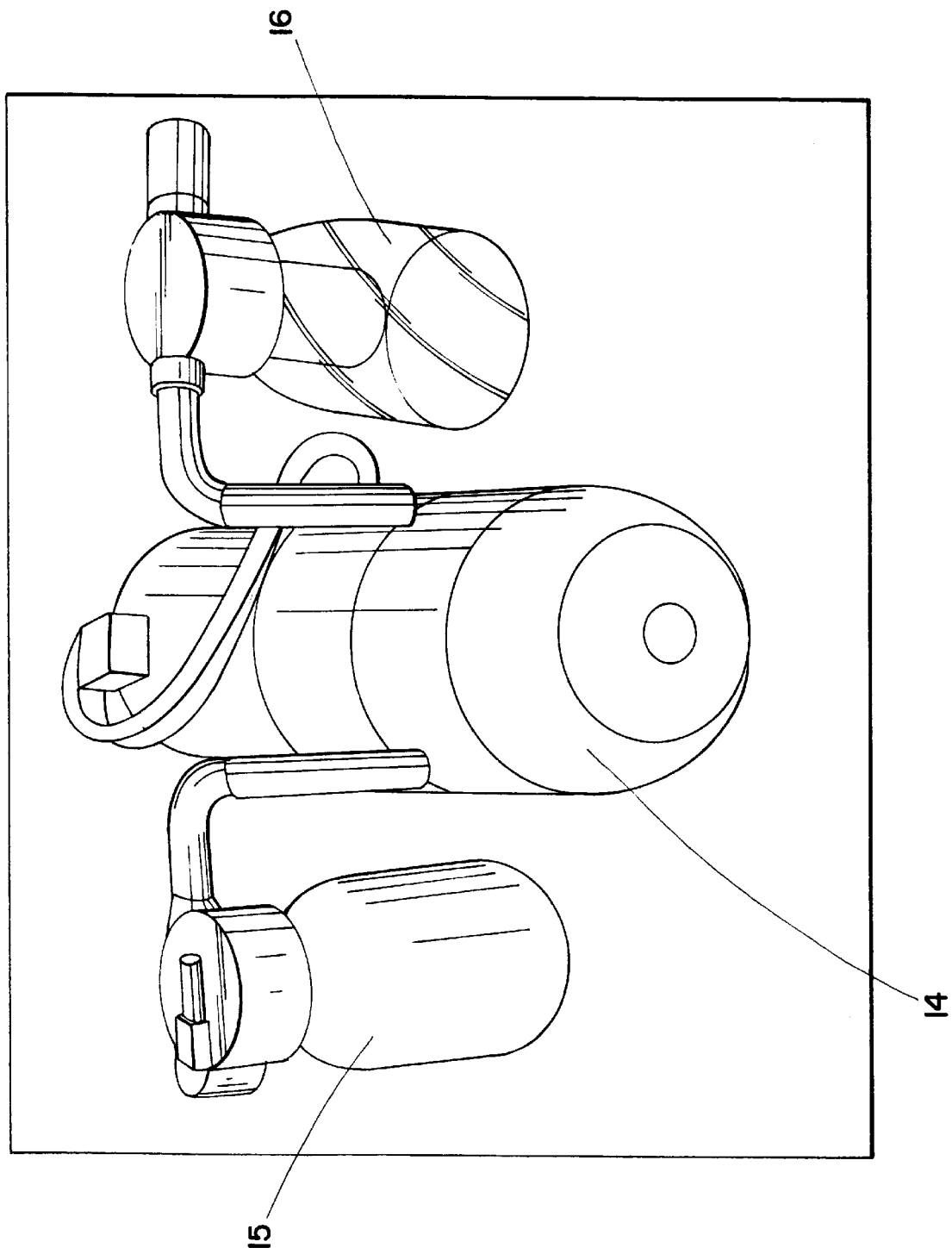
FIG. 6 is a schematic diagram of a preferred embodiment of a vacuum pump.

The vacuum pump used in the described embodiment is a Gast model 4Z470 1 hp (0.7 kW) rotary vane type vacuum pump 14, shown in FIG. 6 which is available from Gast Manufacturing Corporation in Benton Harbor, Mich. Upstream of the pump are a desiccant filter (not shown) and a felt filter 15 intended to remove water vapor and solid particles from the pump intake air stream. Water vapor can cause corrosion of the pump housing and particles could scratch the housing surface. There is a felt filter 16 downstream of the pump for collecting carbon particles from the exhaust stream. The carbon particles are generated as the vanes wear during operation. This pump was chosen because of its ability to pump at medium vacuum pressure (between 15 and 25 in Hg [0.5 and 0.8 bars]) and its low maintenance needs. The pump runs oil-less and the only maintenance required is replacement of intake and exhaust felt filters. The pump was sized based on anticipated gas extraction rate from the water. Assuming a maximum water flow rate of 10 gpm (37 L/s), saturated dissolved gas concentration for the intake water, 50% saturated concentration for discharge water and water temperature of 10° C., the volume of dissolved oxygen and nitrogen the vacuum pump from the chamber is 47 L/min (1.7 cfm). Details of this calculation are given in the analysis portion below.

The water level in the tank is regulated by a single solenoid valve controlling the intake flow. The solenoid valve is normally closed (closed when no current is supplied) and requires no pressure differential to open. The signal to the solenoid valve is generated by a controller preferably an Omega LVCC type which is available from Omega Engineering Incorporated in Stamford, Conn. mounted to the top of the tank and connected to three sensing rods inserted into the tank and sealed with Swagelock vacuum fittings which are available from Hanna Instruments Limited in Bedfordshire, England. There are three sensing rods: a high water level rod; a low water level rod; and a reference rod. When the water level falls below the low level rod, there is no conductivity between the high and low level rod and the control activates the solenoid valve. The solenoid valve remains open until the water level reaches the bottom of the high level rod. The solenoid valve is a brass direct-action normally closed solenoid valve. Early in the development of the apparatus, a pilot actuated solenoid valve was used. However, the extreme vacuum downstream of the valve caused the pilot to work improperly and the water level fluctuated widely.

The apparatus is outfitted with controls that account for several failure modes. These controls were developed based on both laboratory and field failures. There are three potential failure modes, as listed in Table 2.

TABLE 2

Summary of Controls

| Failure mode | Sensor | Remedial Action |
| --- | --- | --- |
| Water level in tank too low | Low level water float sensor | Stop all pumps and de-energize the solenoid valve |
| Water overflows tank | Float rises in vacuum line float check | Passive float check checks water from entering vacuum line |
| Power loss to any component | Relay system | Power cut to all components |

Figure 7A:
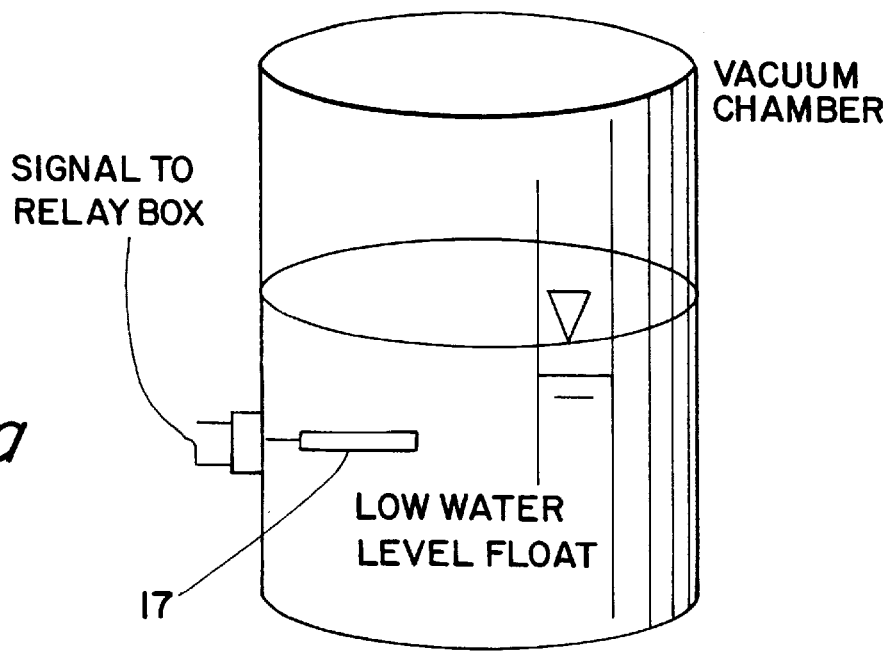
FIG. 7(*a*) is a schematic diagram of a preferred embodiment of a low level sensor.
Figure 7B:
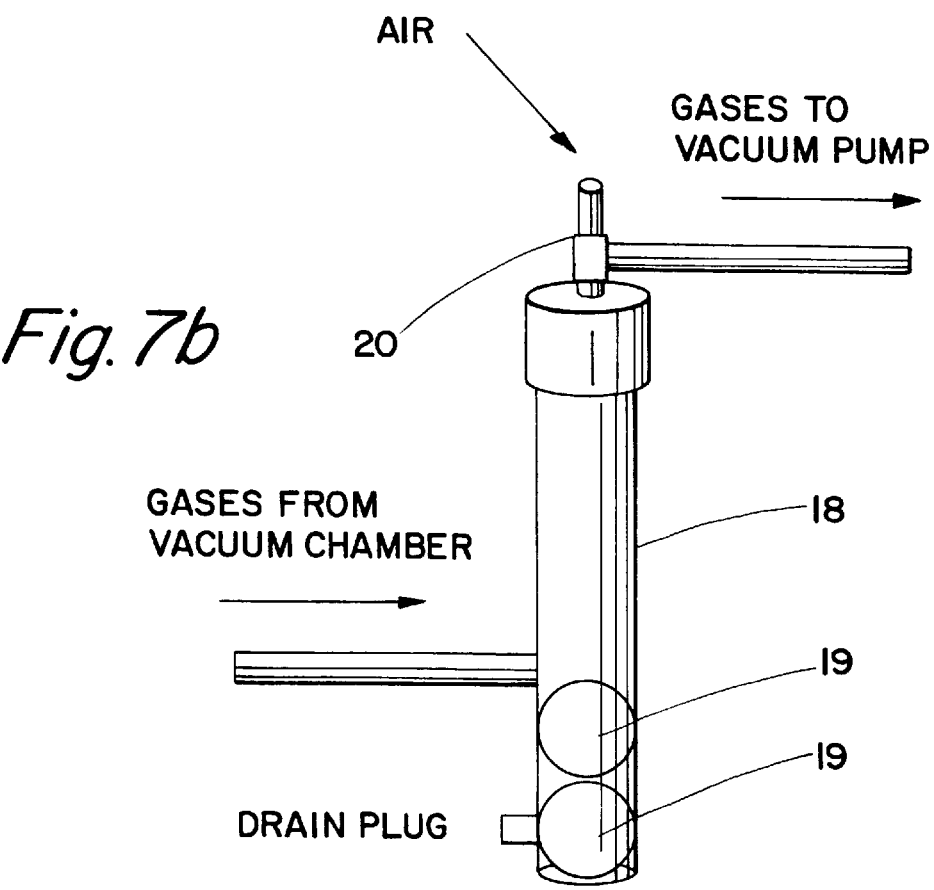

The low water level float sensor 17 is shown in FIG. 7(a) when the water level is above the float level, the circuit in which the float sensor is wired is closed (current flows). When the water level falls, the float falls and the circuit is opened. When this happens, electricity is cut off from all components via a system of relays (not shown). The high water float check 18 is shown in FIG. 7(b). When water enters the check, the solid buoyant balls 19 in the bottom of the check float to the top and seal the gas flow path. Air still enters the system via the air relief valve 20 mounted on the top of the check.

Construction B

Construction B of the vacuum apparatus was designed for use at a water filtration plant. The apparatus treats water from the plant's auxiliary raw water supply. The auxiliary raw water supply is drawn from an intake 1500 ft (500 m) from shore in a body of water, such as a lake. The plant's main intake lines, which convey water to the plant in normal conditions, are located 3200 ft (1000 m) from shore. The auxiliary raw water is used to meet emergency demand and during maintenance on the plant's main intakes.

Figure 8:
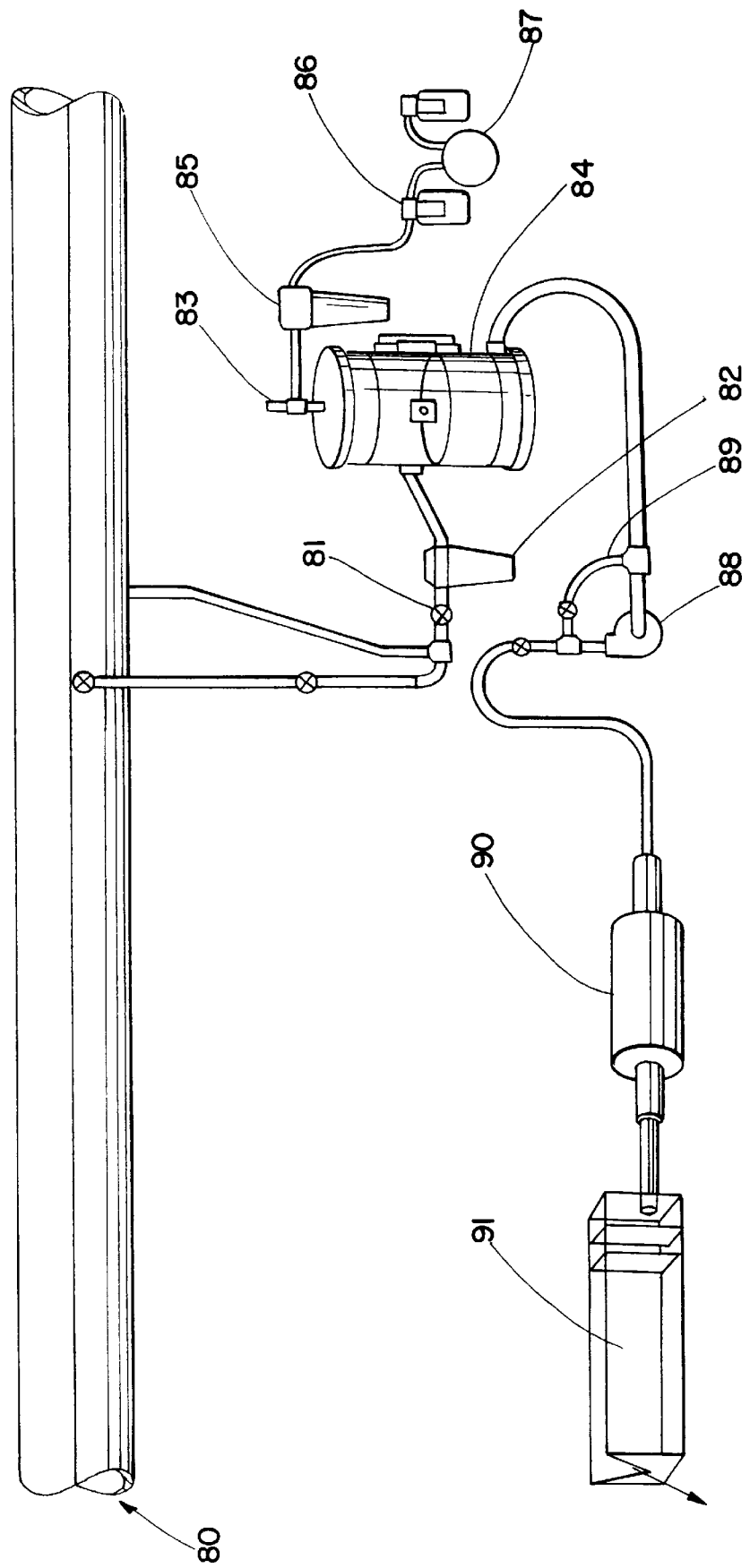
FIG. 8 is a schematic diagram of construction B.

FIG. 8 is a schematic diagram of Construction B as installed at a lake. Construction B includes a water supply 80, a solenoid valve 81, a sediment trap 82, a vacuum relief valve 83, a vacuum chamber 84, a desiccant filter 85, a particle filter 86, a vacuum pump 87, a discharge pump 88, a pump recirculation line 89, a biobox 90, and a weir 91. The apparatus also employs a single discharge line and a single intake line. Downstream of the discharge pump 88 are two test sections. There is the biobox 90, which is a large, baffled low-flow region through which water with a controlled oxygen level passes. The biobox 90 was designed as a prime location for zebra mussel veligers to settle. Downstream of the biobox 90 is an open channel and the weir 91. The channel and weir 91 provide a convenient means for oxygen concentration measurement and flow rate measurement. The only control fitted to Construction B is the high water level float check. The other controls were not added to the system because they were developed after Construction B was installed at the lake.

Construction D

Construction D was fabricated for laboratory experiments. It is similar to its predecessors, with the exceptions that it has larger intake and discharge ports, a site glass for spray observation and a flow meter in the test section. Construction D is shown schematically in FIG. 9. Because Construction D was built to determine experimentally the highest throughflow at which the apparatus can operate efficiently, it has two intake ports, each with its own solenoid valve. Both solenoid valves are wired to a single controller and a switch was added in the circuit to one of the solenoid valves to permit operation with only one valve.

Figure 9:
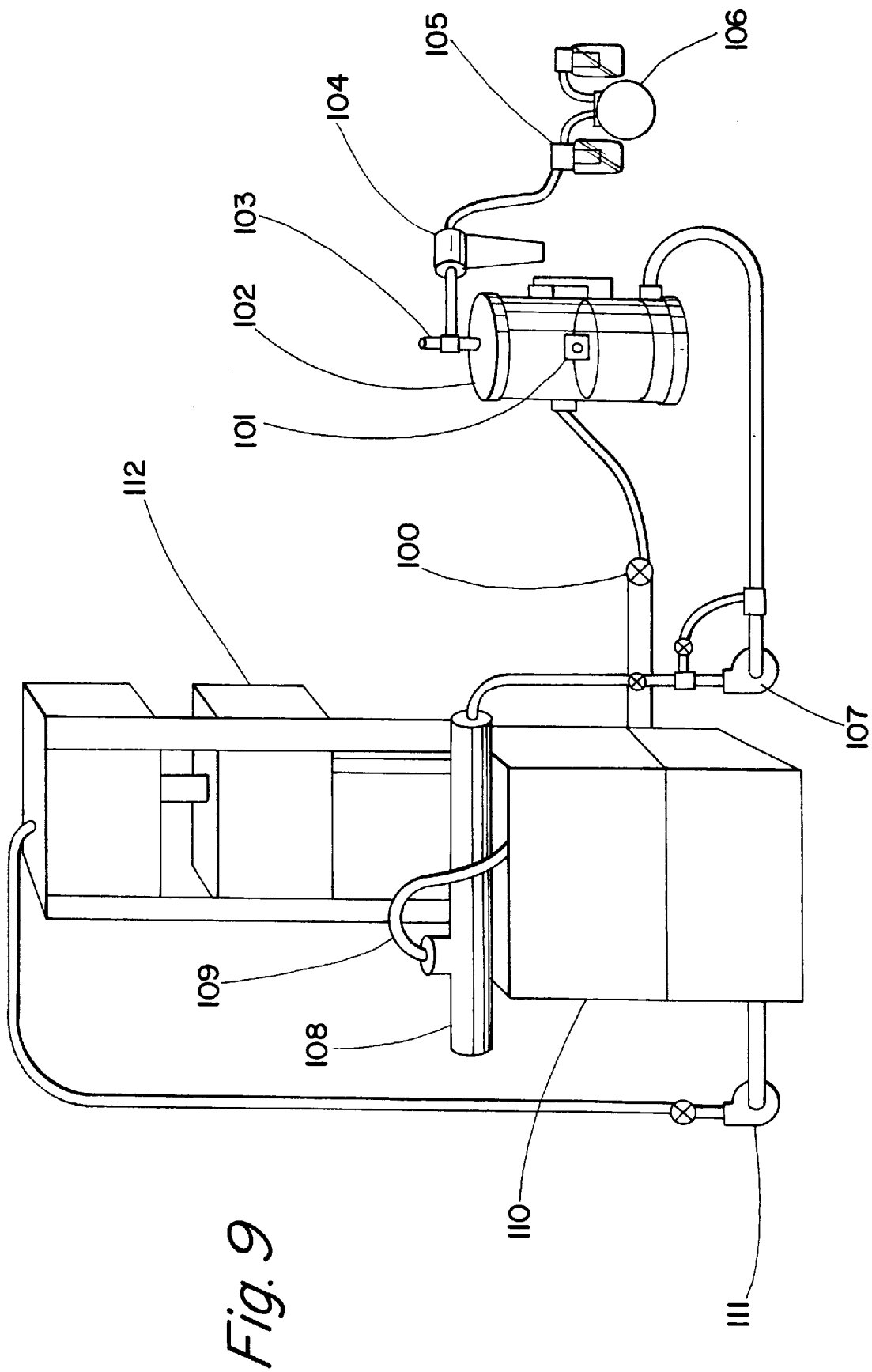
FIG. 9 is a schematic diagram of construction D.

Construction D, as shown in FIG. 9, includes a solenoid valve 100, an auxiliary intake port 101, a vacuum chamber 102, a vacuum relief valve 103, a desiccant filter 104, a particle filter 105, a vacuum pump 106, a discharge pump 107, a test section 108, a discharge line 109, a re-aeration tank 110, a return pump 111, and an apparatus intake reservoir 112. Construction D also employs low-level sensor and the relays that detect power loss to any component, but not the tank overflow check. No recirculation pump is used in Construction D, though retrofitting a recirculation line would not be difficult.

Testing

Two series of tests, laboratory and field tests, have been conducted with the vacuum apparatus. The objective of the laboratory tests were (1) to assess and trouble-shoot components; (2) to establish optimal operating conditions; and (3) to reveal and analyze the physics and performance and the apparatus. The objectives of the field tests were: (1) to show that the apparatus prevents zebra mussel settlement under real-world conditions; and (2) to identify real-world operating conditions. The measurements constituting a test include: (1) intake dissolved oxygen content; (2) discharge dissolved oxygen content; (3) water flow rate; (4) vacuum chamber refill rate (cycle time for solenoid valve opening); (5) spray characteristics (only in laboratory experiments); and (6) visual inspection of biobox for mussel settling (only in field site experiments).

Testing Procedures

Figure 10:
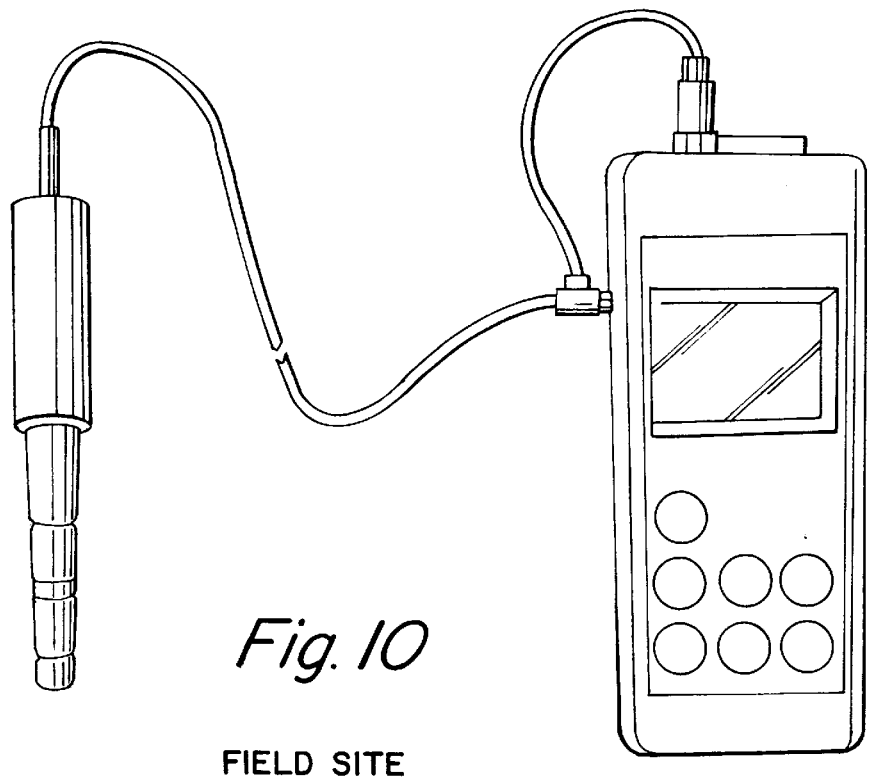
FIG. 10 is a drawing of a dissolved oxygen meter.

The dissolved oxygen concentration and temperature of the intake and discharge streams were measured using a Hanna Instruments Corporation model 9145 dissolved oxygen meter which is available from Hanna Instruments Limited in Bedfrodshire, England. The meter is shown in FIG. 10. The probe has a membrane at its tip filled with an electrolyte solution. A thermocouple located about 1.5 inches (3.75 cm) from the tip measures temperature. The meter was chosen for its portability and ease of use. The meter self-calibrates in air following a 10 minute warm-up period and can be calibrated to account for elevation and salinity. A flow rate of 1 m/s (3 ft/s) is required for an accurate measurement.

Figure 11:
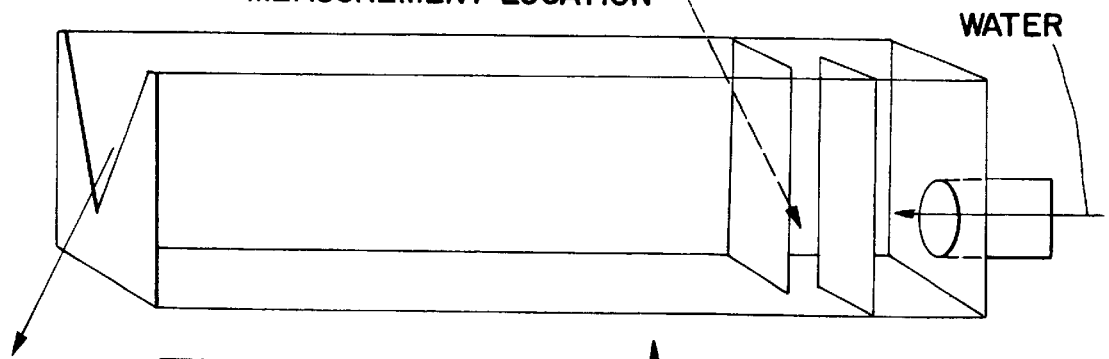
FIG. 11 is a schematic diagram of a field site dissolved oxygen measurement location.

In experiments involving Construction A, water samples were drawn into a 500 ml beaker from the test section discharge. A magnet was placed in the sample which was placed on a magnetic stirrer intended to provide sufficient water velocity for accurate oxygen measurement. The oxygen probe was mounted on a ring stand and lowered into the beaker so that the thermocouple was submerged. This method was discontinued in favor of measurement directly from the discharge tube. The disadvantages of the former method were that is was time-consuming and provided too much opportunity for air entrainment into the water sample. At the field test site, the oxygen concentration is measured at the discharge of baffles preceding the flow measurement weir. This measurement site was chosen both for its accessibility and because the water velocity at that site is greatest. The field site oxygen measurement location is shown in FIG. 11.

In laboratory experiments, the intake water dissolved oxygen content and temperature were measured in the reservoir upstream of the solenoid valve. Because the water was stagnant in the reservoir, it was necessary to stir the water with the probe to obtain consistent measurements. Even so, the intake dissolved oxygen concentration measurement is not as accurate as discharge dissolved oxygen concentration. Except for some early tests, it was not possible to obtain direct dissolved oxygen measurements for intake water at the field test site. However, operators state that the dissolved oxygen concentration for intake water is usually near saturation content.

At the field site the water flow rate was measured using a V-notch weir housed in an acrylic open channel. In the laboratory an in-line flow meter was used for flow measurement. In both cases the flow measurements were checked via the bucket and stopwatch method. Both measured proved adequate, since the flow rate was steady except during the start-up process.

Spray characteristics were observed through a 4 inch (10 cm) diameter site glass bolted to the vacuum chamber. The data taken were qualitative in nature and somewhat subjective. The spray was considered "narrow" if the stream diameter did not increase as the water traveled into the tank and few droplets were atomized. Otherwise, the spray was considered "wide". In practice, there was a distinct difference between the two spray patterns and the results of these observations are considered reliable.

Tests

In each laboratory test, a vacuum chamber water level, vacuum pressure and flow rate were set and the apparatus was run for at least 40 minutes or until the discharge and intake oxygen concentration were steady. During the test the dissolved oxygen and temperature in intake and discharge streams and flow rate were measured and recorded on a rotating basis. Typically, one cycle of measurements takes about 4 minutes, so about 15 measurements are made per hour. After about 10 minutes, the output of the apparatus was usually steady.

At the field site, the flow rate was set to a minimum level to ensure reliable discharge pump operation and vacuum pressure was set to ensure discharge dissolved oxygen concentration was well below 50% of the saturation concentration. Because the auxiliary line from which water was taken was not in use, it was not possible to treat high flow rates of water, since pressure in the auxiliary line was low and because the capacity of the line could not be exceeded. Once the flow rate and vacuum pressure were set, they were not changed for the duration of the test. On each site visit the discharge dissolved oxygen concentration, flow rate and solenoid cycle time were measured and recorded and a log entry was made detailing the biobox contents. Roughly each month it was necessary to take the system off line to perform periodic maintenance including changing vacuum pump felt filters, changing desiccant in the vacuum line and cleaning the trap upstream of the solenoid valve.

Analysis

There are four parameters of interest in test results for the vacuum apparatus: (1) the raw change in dissolved oxygen concentration; (2) the rate of dissolved oxygen removal; (3) the efficiency of dissolved oxygen removal; and (4) the gas transfer coefficient. While these four parameters are analyzed theoretically, the effectiveness of the present invention is not limited by theory.

The raw change in dissolved oxygen concentration is important because macrofoulers such as zebra mussels and their veligers are adversely affected both by the absence of dissolved oxygen and also by changes in oxygen concentration for which they are not acclimated. The other parameters are of interest because they indicate whether or not the apparatus is operating efficiently and what design modifications would increase oxygen removal.

Oxygen Removal Rate and Efficiency

Figure 12:
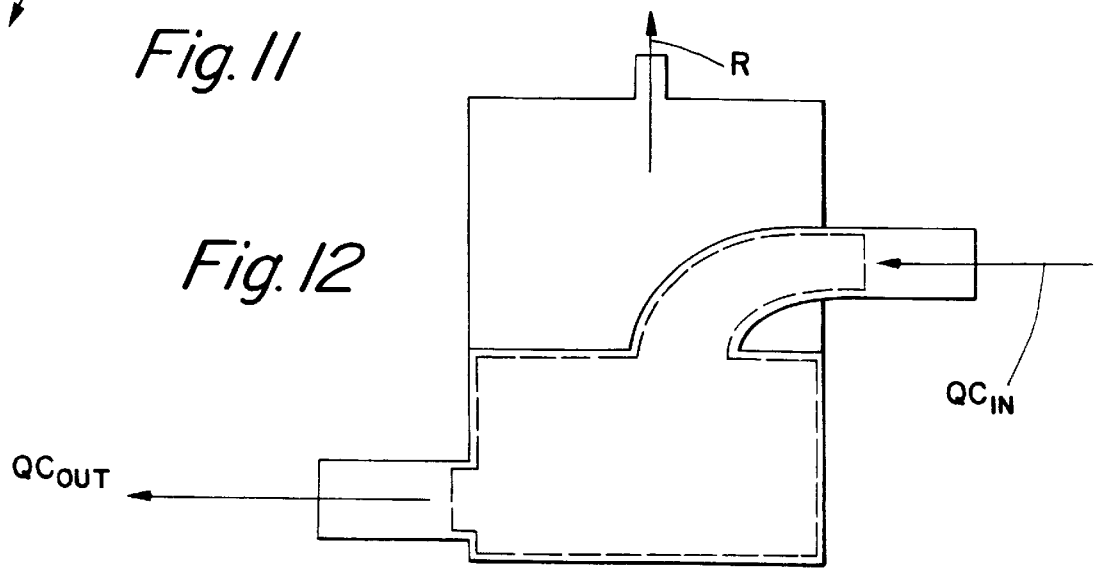
FIG. 12 is a schematic diagram of the control volume of a preferred embodiment of a vacuum chamber.

The vacuum chamber is shown as an open system in FIG. 12, where $C_{in}$ refers to the intake oxygen concentration, $C_{out}$ is the discharge oxygen concentration, Q is the water throughput and R is the rate of oxygen removal. Dissolved oxygen crosses the control surface as it enters the chamber, at the air-water interface and at the water discharge. Applying conservation of oxygen for the control volume yields:

$$R = \frac{\partial C}{\partial t} = Q(C_{in} - C_{out})$$

The theoretical maximum removal rate of oxygen for a particular vacuum pressure is $$R_{max} = Q(C_{in} - C_{sat})$$

where $C_{sat}$ is the saturation oxygen concentration, the lowest achievable oxygen concentration at the vacuum pressure. The oxygen removal efficiency is then defined as $$\eta = \frac{R}{R_{max}} = \frac{C_{in} - C_{out}}{C_{in} - C_{sat}}$$

Gas Transfer Coefficient

Assuming negligible gas phase resistance to diffusion, the gas transfer coefficient is given by $$K_L a = \frac{C_{in} - C_{out}}{\theta_H (C_{in} - C_{sat})}$$

where $K_L a$ is the gas transfer coefficient (in time$^{-1}$) and $\theta_H$ is the hydraulic residence time in the vacuum chamber.

Gas Phase Composition and Flow Rate

The gas phase composition and flow rate are important for two reasons: for selecting the vacuum pump; and to ensure that the partial pressure of oxygen does not rise and impede oxygen transfer from the water. In this section, the anticipated gas flow rate and void space composition are estimated.

Saturated concentration of oxygen and nitrogen in water at 10° C. are 18.4 mg/L and 11.4 mg/L, respectively. Assuming that 50% of both dissolved gases is removed in the vacuum apparatus, the gas flow through the vacuum pump is given by:

$$\dot{m}_{gas} = Q(C_O - 0.5 C_O) + Q(C_N - 0.5 C_N)$$

where the subscript O refers to oxygen and N refers to nitrogen. Assuming a flow rate of 10 gpm (38 L/min), the resultant gas flow rate out of the water and through the vacuum pump is 56.4 g/min (3.38 kg/h). Converting to free-air discharge, the pump through flow is:

$$Q_{air} = \frac{\dot{m}_{gas}}{\rho_{air}} = \frac{56.4 \text{ g/min}}{1.2045 \text{ g/L}} = 46.8 \text{ L/min} = 1.65 \text{ ft}^3/\text{min}$$

If oxygen dissolves more readily from the water stream, the partial pressure of oxygen in the vacuum chamber will progressively increase, impeding oxygen removal. So the relative rates of oxygen and nitrogen diffusion are now compared.

The convective diffusion rate of oxygen from a turbulent flow of water is given by $$\dot{m}_O = h_O \frac{dC_O}{dx} \approx h_O \frac{\Delta C_O}{\Delta x} = h_O \frac{(C_O)_{in} - (C_O)_{sat}}{\Delta x}$$

where h is the turbulent convective mass transfer coefficient and $\Delta x$ is the depth of the liquid film. Similarly the nitrogen, $$\dot{m}_N \approx h_N \frac{(C_N)_{in} - (C_N)_{sat}}{\Delta x}$$

There are two expressions commonly used for calculating the convective mass transfer coefficient. First, the convective mass transfer coefficient can be found by $$h = \frac{j_D V}{S_c^{3/2}}$$

where $j_D$ is the Colburn "j" factor, V is the water velocity and $S_c$ is the Schmidt number.

Alternatively, the convective mass transfer can be calculated as a function of Reynolds and Schmidt numbers. The expression takes the form $$Sh = \frac{hL}{D} = cR_e^a S_c^b$$

where Sh is the Sherwood number, L is a characteristic length (the spray diameter, in this case), $R_e$ is Reynolds number, $S_c$ is the Schmidt number and c, a, and b are empirical parameters.

From Henry's law, the saturation concentration of the gases in the water is proportional to the partial pressure in the gas above the water, which is, in turn, proportional to the mass fraction of each constituent gas ($n_o/n_N$). Thus, the ratio of saturation concentration of dissolved oxygen to dissolved nitrogen in water is given by:

$$\frac{(C_{sat})_O}{(C_{sat})_N} = \frac{(K_H)_O n_O M_O}{(K_H)_N n_N M_N}$$

where M is the species molecular weight. Combining the above equations and manipulating yields:

$$\frac{\dot{m}_O}{\dot{m}_N} = \left[\frac{(S_c)_N}{(S_c)_O}\right]^{3/2} \frac{(K_H)_O n_O M_O}{(K_H)_N n_N M_N}$$

For air at 20° C. and atmospheric pressure, $$\left[\frac{(S_c)_O}{(S_c)_N}\right]^{3/2} = 1.151$$

$$\left[\frac{(K_H)_O}{(K_H)_N}\right] = 1.97$$

$$\left[\frac{n_O}{n_N}\right] = \frac{1}{3.76}$$

Assuming the ratio of these parameters remains roughly the same as pressure decreases, the ratio of mass diffusion rates of oxygen and nitrogen from the water is then:

$$\frac{\dot{m}_O}{\dot{m}_N} = 0.69$$

So dissolved oxygen diffuses out of the water at 69% the rate of nitrogen. This indicates that: the oxygen composition in the vacuum chamber void space decreases with time; and oxygen diffusion out of the water increases with time.

From the foregoing, one may determine the oxygen content in the oxygen-depleted water produced by the apparatus, and for use in the method of, the present invention, depending upon the ambient temperature and depth parameters at the intake from the body of water infested with macrofoulers, such as zebra mussels, quagga mussels, and asiatic clams. As used herein, it will be understood that "oxygen-depleted" water refers to water which is reduced in oxygen content below the level necessary to support living macrofoulers and/or their larvae, such as zebra mussels and their veligers.

Figure 13:
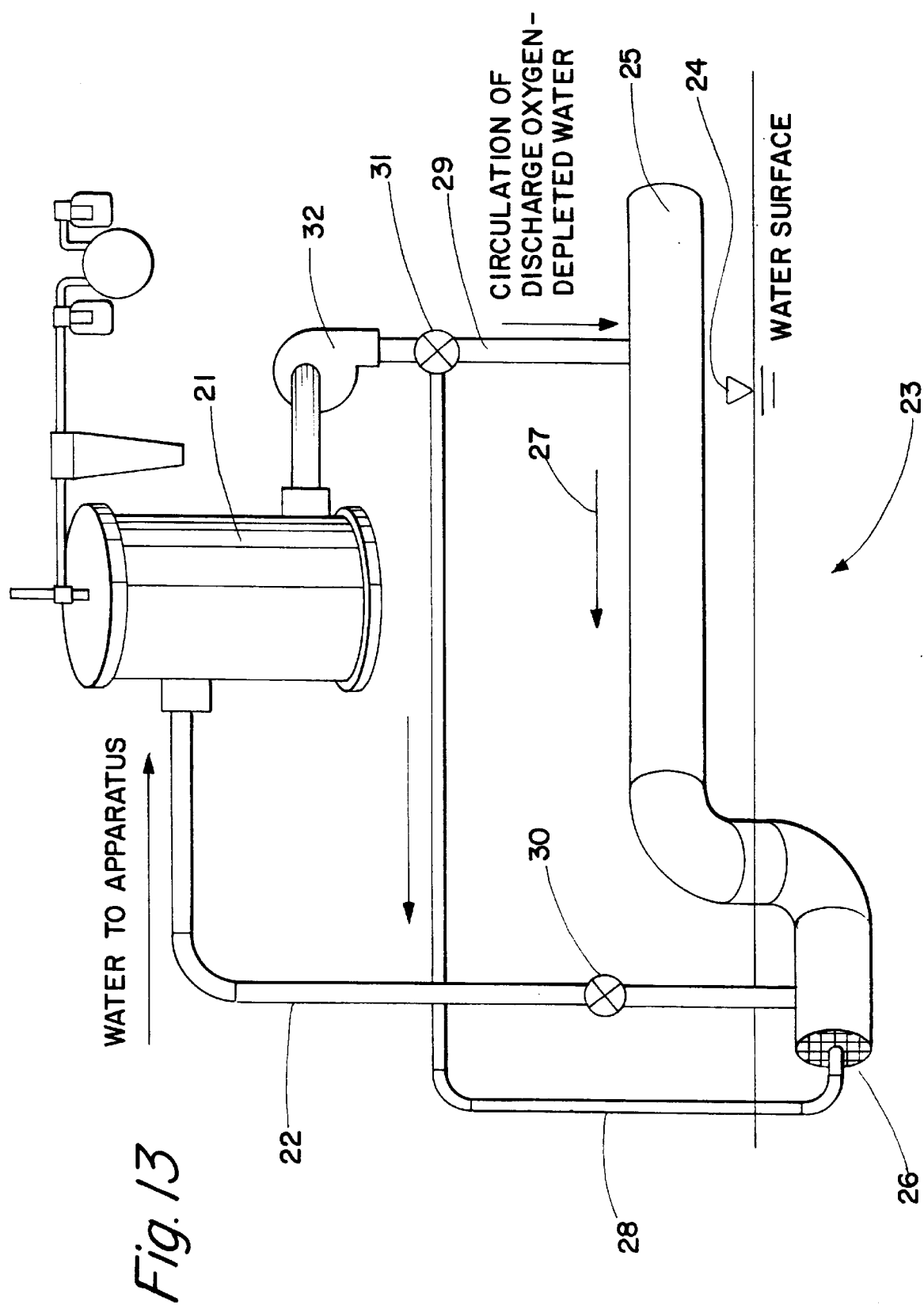
FIG. 13 is a schematic diagram of a preferred embodiment of the apparatus of the present invention.
Figure 14:
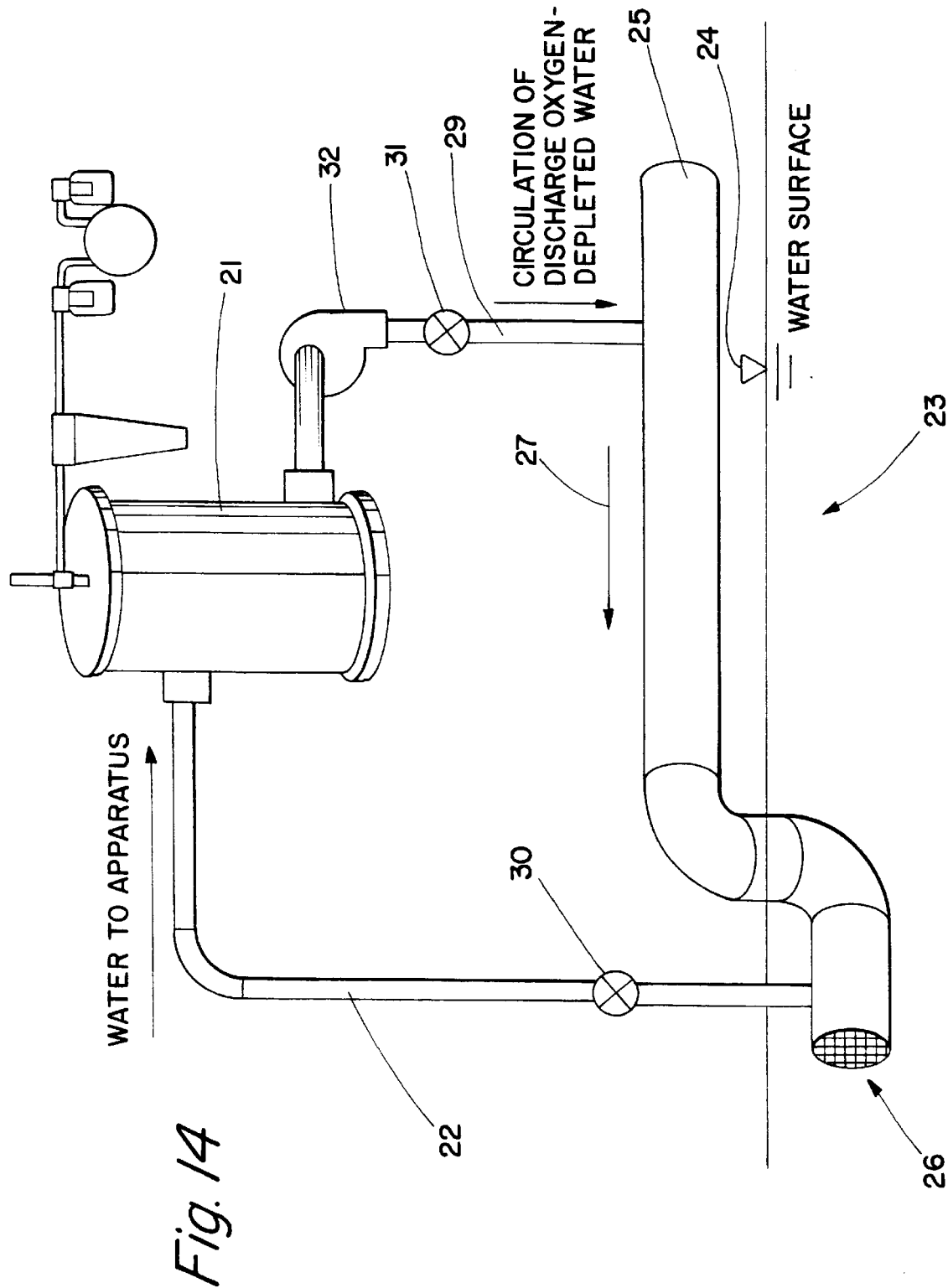
FIG. 14 is a schematic diagram of another preferred embodiment of the apparatus of the present invention.
Figure 15:
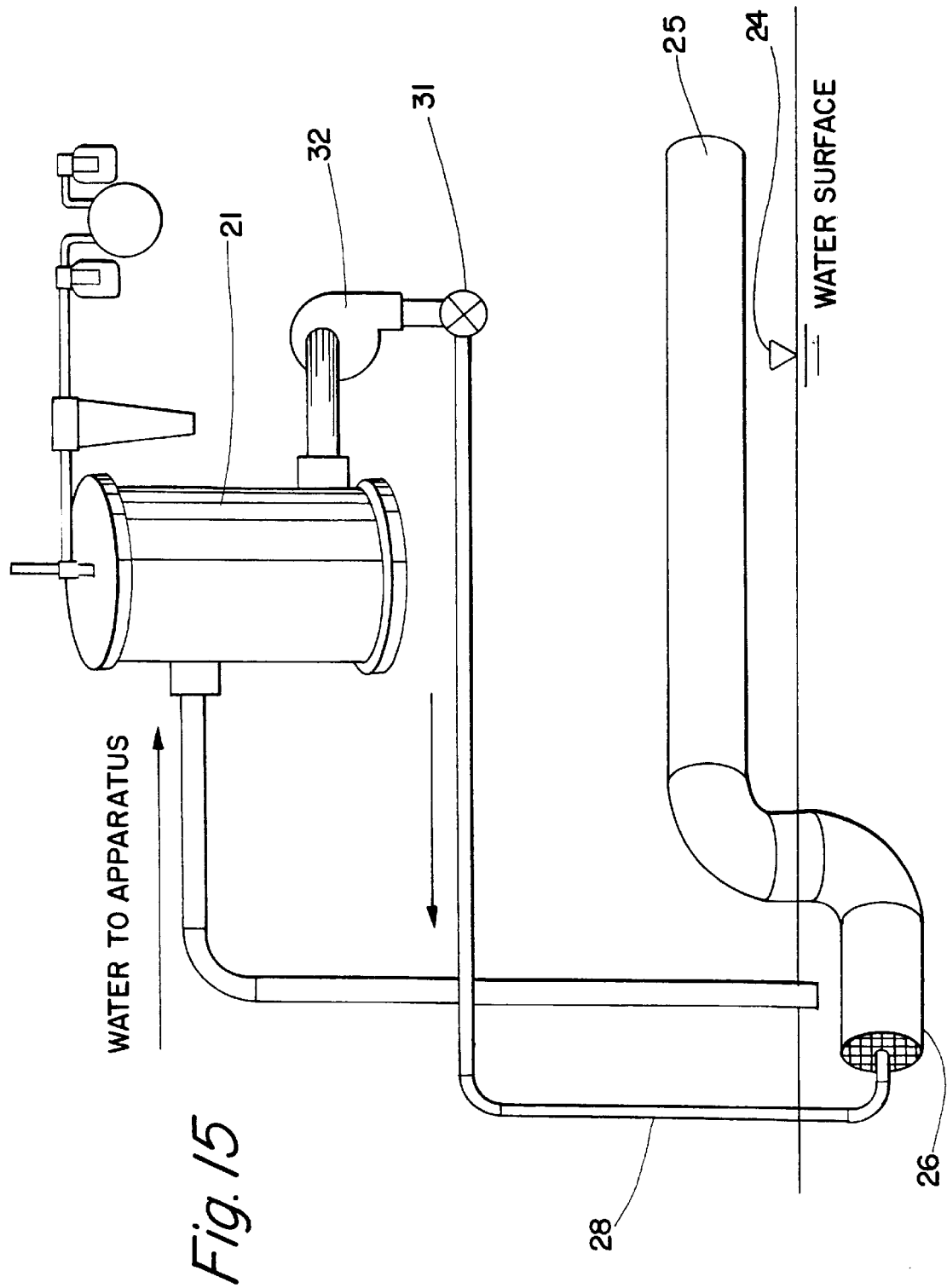
FIG. 15 is a schematic diagram of a third preferred embodiment of the apparatus of the present invention.
Figure 16:
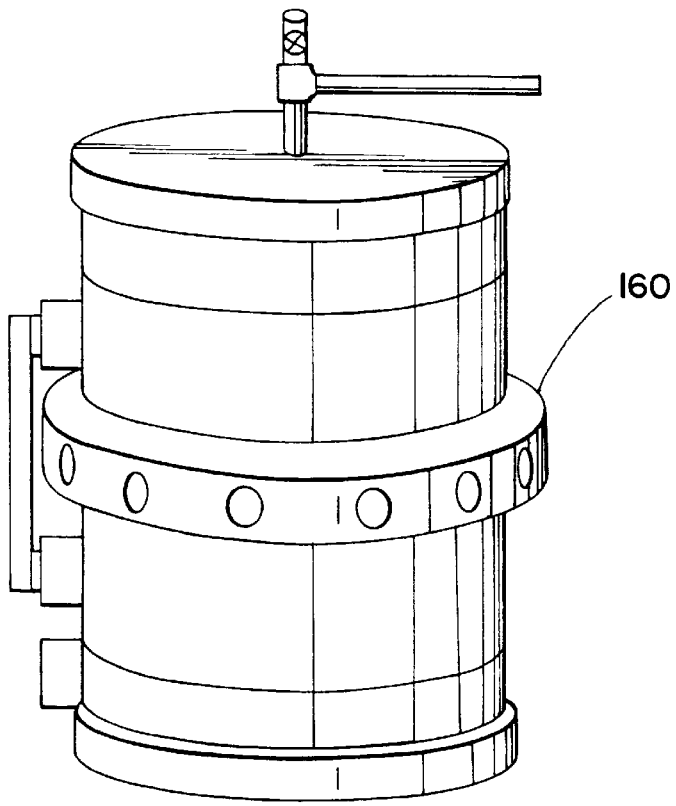
FIG. 16 is a schematic diagram of a preferred embodiment of a vacuum chamber with a multiple intake port collar.
Figure 17:
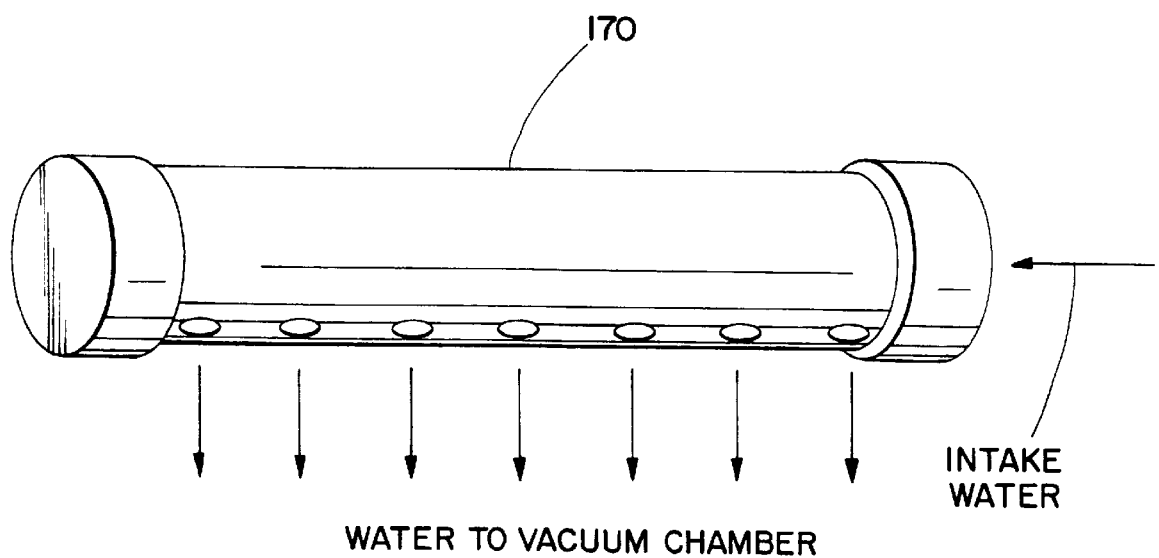
FIG. 17 is a schematic diagram of a preferred embodiment of a rail-type spray adapter.

FIGS. 13–15 show alternative embodiments of the apparatus of the present invention.

FIG. 13 shows vacuum device 21 being supplied with a source of water via uptake conduit 22. It will be recognized that the source of water to be supplied to vacuum device 21 may be from the same or a different source than the body of water 23 having surface 24 (such as a municipal or other clean water source). The vacuum device 21 may include a pump 32, a control valve 31, and a discharge conduit 29. The vacuum device 21 produces oxygen-depleted water, and supplies the intake water conduit 25 (having intake opening 26) with a flow of oxygen-depleted water via water discharge conduit 29. In a preferred embodiment of the apparatus, the oxygen-depleted water flows through the water conduit toward the body of water 23, as indicated by the directions arrow 27. These components, i.e., vacuum device 21, uptake conduit 22 and water discharge conduit 29, together with a portion of the intake water conduit 25, make up an oxygen-depleted water generation and recirculation system.

FIG. 13 also shows that the vacuum device 21 may optionally or alternatively supply a flow of oxygen-depleted water through flushing conduit 28 so as to bathe the intake opening 26 with a substantially continuous flow of oxygen-depleted water. It will be understood that this bathing oxygen-depleted water will be somewhat diluted by the water in body of water 23 about intake opening 26. However, the oxygen content of the water produced by vacuum device 21 may be adjusted so as to control for a diluent effect so as to maintain the water around intake opening 26 in an oxygen-depleted state. The vacuum device 21 and the flushing conduit 28 make up what is referred to as an oxygen-depleted water bathing or flushing system for the intake opening 26 of intake water conduit 25.

The flow of oxygen-depleted water for the oxygen-depleted water generation and recirculation system and the oxygen-depleted water bathing or flushing system (generated through pump 32), may be controlled by control valves 30 and 31 which control, respectively, the uptake of water from the body of water 23 (or an alternative source) and the output of oxygen-depleted water. These control valves are closed when water need be supplied through intake conduit on-demand. Such conduits may supply water for instance, for cooling, for emergency fire suppression or for other on-demand industrial uses.

The fluid conduits used in the apparatus of the present invention may be of any material appropriate for conducting liquids under the conditions created by the vacuum device. Such materials may include metals and plastics, such as is used in steel pipe, polymeric tubes and hoses, and PVC pipe. The water conduit served by the present invention may be of any length and diameter, and flow rates of the oxygen-depleted water can be adjusted to provide a sufficient flow to restrain fouling.

FIG. 14 shows an alternative embodiment of the present invention comprising only the oxygen-depleted water generation and recirculation system as described in FIG. 13, without the oxygen-depleted water bathing or flushing system. Like numerals are used to indicate similar features.

FIG. 15 shows an alternative embodiment of the present invention comprising only the oxygen-depleted water bathing or flushing system as described in FIG. 13, without the oxygen-depleted water generation and recirculation system. Like numerals are used to indicate similar features.

As an alternative to the present invention or to supplement it, the apparatus of the present invention may be used to provide a source of heated water in the same fashion as described with respect to the supply of oxygen-depleted water. In this regard, the present apparatus may be altered by providing a water heater instead of a vacuum device to provide a heated water generation and recirculation system and/or a heated water bathing or flushing system. This may be done by replacing or supplementing the vacuum device 21 as described above with a device to heat the water to a temperature above which the macrofoulers cannot survive, such as through use of gas water heaters or electrical water heaters. The apparatus of the present invention may then operate in the same fashion as described above by producing heated (and also optionally oxygen-depleted water), and using it in the water generation and recirculation system and/or a water bathing or flushing system described above.

The applicability of this system will depend upon the regulations governing the release of heated water into the subject body of water where the described water generation and recirculation system is used.

The performance of the apparatus of the present invention may be compromised by any of the following events:
 failure of the solenoid valve to regulate intake water flow;
 accumulation of debris in the solenoid valve that prevents the valve from shutting fully;
 reduction or interruption of intake flow and draining of the vacuum chamber;
 power failure to one or all components; or
 fouling of the vacuum relief valve.

To ensure the apparatus is not damaged and operation is not compromised by any of these events, the apparatus may employ:
 a mechanical check (such as a float) to check water from entering the vacuum line;
 a trap or screen upstream of the solenoid valve for catching large debris that might settle in the valve;
 a control system that deenergizes all components when power is lost to any of the components;
 a control system that deenergizes all components when the water level flows below a predetermined low level in the tank; or
 an air filter for cleaning air entering the vacuum relief valve.

Even if all these suggested controls and checks are applied, periodic maintenance may still be necessary for continuous operation of the apparatus. Because of the simple nature of the apparatus, plant operators may require only minimal training and time commitments for daily operation of the apparatus. Regular maintenance may only entail around a half-hour of down-time for completion and may require little training and no special tools. A suggested observation and maintenance schedule for the apparatus is found in Table 3.

TABLE 3

Proposed Observation and Maintenance Schedule

| Activities | Recommended time interval |
| --- | --- |
| Observe water level site glass to ensure vacuum chamber is not empty or overfilled. | Daily |
| Observe vacuum gauge and determine whether vacuum pressure is maintained at appropriate level | Daily |
| Check discharge to ensure water is flowing at the desired rate. | Daily |
| Inspect apparatus for irregular behavior such as dirt build-up in vacuum relief value, rapid cycling of the solenoid valve or leakage from any hoses or pumps. | Two weeks |
| Measure intake and discharge dissolved oxygen concentration. | Two weeks |
| Replace vacuum pump felt filters | Two months |
| Replace desiccant in the desiccant filter. | Four months |
| Replace solenoid valve. | Two years |

Oxygen Removal Physics and Design Ramifications

Physical processes that influence the oxygen removal efficiency of the apparatus include:
 spray formation;
 water-air interface gas transfer; and
 mixing of the water pool in the vacuum chamber.

Experimental results indicate that the first two processes are more important than the last. Examination of the influence of vacuum chamber water level on oxygen removal rate and efficiency clearly indicated that spray removal of dissolved oxygen is critical for efficient operation of the apparatus. An apparatus that accomplishes efficient dissolved oxygen removal in the spray is more compact than an apparatus that utilizes a long hydraulic residence time to enhance oxygen removal and requires less equipment and less power than an apparatus that enhances oxygen removal through recirculation of the water in the vacuum chamber.

The degree to which the intake stream atomizes is dependent on the size and shape of the intake port and the pressure difference between the water source and the vacuum pressure in the vacuum chamber. There are several means by which atomization of the intake stream might be enhanced. These are:

changing the intake port size;

changing the intake port shape;

employing a sprinkler-type intake;

mounting a splash plate upon which the intake stream impinges; and boosting the pressure of the intake stream.

Among these modifications, the only one posing severe difficulties in implementation is boosting the pressure of the intake stream. In order to employ this modification major changes are necessary in the water level control scheme. One of the simplest means for changing spray character would be to employ two intake ports rather than the single port currently used. Following the multiple intake streams idea to its logical end, the vacuum chamber could be outfitted with an intake port collar 160, as depicted in FIG. 16. The water could be conveyed to the individual ports either by individual tubes or by a manifold mounted outside the collar 160. Such a configuration would be complex to fabricate and the drilling of multiple holes could weaken the vacuum chamber.

Another means for improving atomization would be to insert a rail-type spray adaptor 170 into the intake port. A diagram showing this modification is shown in FIG. 17. The rail 170 could be made from PVC pipe and cemented either directly into the intake port or into an adapter that could be screwed into the intake port threads.

In addition to breaking up the intake stream and increasing the air-water surface area, a rail-type spray adapter 170 would also eliminate waves in the water pool in the vacuum chamber and would direct water away from the vacuum line. Waves in the vacuum chamber sometimes cause the solenoid valve to cycle on and off rapidly and water in the vacuum line can damage the vacuum pump.

A splash plate installed inside the vacuum chamber would be another means for breaking up the intake spray and deflecting water away from the vacuum line. An advantage the splash plate has over the rail-type spray adapter 170 is that it would not restrict intake flow. A disadvantage is that it would be more difficult to install.

The two features that determine how well oxygen is transferred across the water pool surface are its area and the turbulence at the water surface. In the interest of keeping the device compact and for structural considerations, the chamber diameter should be kept as small as possible. The only practical means for generating turbulence at the water surface is via the intake stream. Addition of a mixer or some other means for generating turbulence at the water surface may not be justified since the gains in oxygen removal efficiency from adding it would likely be modest.

In-chamber mixing only improves oxygen removal at moderate vacuum pressures. At high vacuum pressure, most of the oxygen removal takes place in the intake spray. Consequently, addition of mixing via either some stirring mechanism or pumped recirculation of water in the vacuum chamber is not recommended unless the system is designed to run at modest vacuum pressure. Recirculation of water in the vacuum chamber is especially difficult, since a recirculation pump pulls water against a strong vacuum and the pump impeller may become damaged due to cavitation. Larger pumps (such as the apparatus discharge pump) with larger impellers are less prone to damage.

Furthermore, because the geometry of the vacuum chamber plays an important role in determining the oxygen removal efficiency, care should be taken when sealing the apparatus for treating higher flow rates. To determine the proper operating conditions for reducing the oxygen concentration to a desired value for a desired flow rate, the following procedure is recommended:

Experimentally determine the oxygen removal efficiency for the apparatus when the vacuum chamber is 65% full of water (optimal conditions), for a vacuum pressure of 23 inches Hg (0.78 mbar), and for a flow rate around 10 gpm (38L/min);

Adjust the discharge oxygen concentration for the desired flow rate using the relation $$\log\left(\frac{C_Q}{C_{sat}}\right) = \log\left(\frac{C_{10\text{ gpm}}}{C_{sat}}\right) + 0.0058\times(Q - 10\text{ gpm})$$

where C is the dissolved oxygen concentration, Q is the water flow rate in gpm, subscript Q denotes the conditions at the desired flow rate, and subscript sat denotes saturated conditions at atmospheric pressure; and Determine the vacuum pressure required for the desired oxygen removal via the equation $$\eta_P = \frac{\left(1 - \frac{C_P}{C_{sat}}\right)}{\left(1 - \frac{29.9 - P}{29.9}\right)} = \eta_{23} + 3.35\times(P - 23)$$

where P is the vacuum pressure in inches Hg and the subscript P denotes conditions at that vacuum pressure.

As with other reactors, the vacuum device may be installed in parallel with other vacuum apparati for increased throughflow or in series with other apparati for greater oxygen removal.

A preferred embodiment of the apparatus may be used to treat water in an open system. The apparatus may, however, be employed for treating water in a closed system such as a ballast tank on an ocean-going ship. Ballast water is an important vector for exotic species, and the United States and Canadian coast guards are actively seeking means for ensuring safe disposal or treatment of the water. It may be possible to draw water from a ballast tank into the vacuum apparatus and circulate discharge water back into the ballast tank. Continuous treatment of the ballast water would reduce oxygen concentration to the mortality level for macrofoulers. Prior to attempting ballast water treatment, the dissolved nitrogen and dissolved carbon dioxide removal capability of the apparatus may need to be determined. Then the concentration of all these dissolved gases that must be maintained to sterilize water may need to be researched.

Another closed system that may be protected from macrofouler infestation is fire protection systems for locks and dams and power plants. These systems remain idle except during periodic maintenance and make ideal locations for macrofouler colonizations. Fire protection systems may be required to generate high flow rates of water, and mussel infestation would interfere with their operation. The vacuum apparatus may be employed to treat and recirculate water in either a portion of the fire protection system or in the entire system. One unique control that may be added to an apparatus used to treat a fire protection system is an automatic cut-off when the fire protection is in use or being maintained.

The apparatus may also be used for removal of undesirable volatile gases from water, as in a pump-and-treat ground water treatment project. Volatile organic carbons (VOCs) are stripped from a water stream issuing from a kitchen sink tap and cross-flow mass exchangers are routinely used to strip gases from water. The apparatus may prove more efficient and portable than the packed bed and cross flow type reactors currently used in pump-and-treat systems. To use the apparatus in such a fashion, it may be necessary to capture or disperse potentially-noxious exhaust gases from the vacuum pump.

In addition, the method of the present invention may be carried out by operating the apparatus of the present invention as described.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, so as to be able to practice the present invention without departing from its spirit as reflected in the appended claims. It is the intention, therefore, to limit the invention only as indicated by the scope of the claims.

What is claimed is:

1. An apparatus for controlling macrofoulers and larvae thereof in an on-demand water conduit, said apparatus comprising:

a water conduit having an intake opening located in a source of nature water containing macrofoulers and larvae thereof, said water conduit comprising means to conduct a first flow of said nature water on demand in a first direction to a predetermined location to be discharged; and a vacuum device connected to an intermediate portion of said water conduit between said intake opening and said predetermined location where said first flow of said nature water is adapted to be discharged, said vacuum device adapted to receive water, said vacuum device adapted to produce oxygen-depleted water from the received water, said vacuum device also comprising means to provide a first flow of said oxygen-depleted water to the water conduit in a direction opposite the first direction when no demand exists for said first flow of said nature water through said water conduit;

wherein, when there is a demand for said first flow of said nature water through said water conduit, said first flow of said nature water is not diverted through said vacuum device.

2. The apparatus of claim 1 further comprising:

an uptake conduit connected between the water conduit and the vacuum device, said uptake conduit adapted to transfer a second flow of said nature water from the water conduit to the vacuum device;

whereby the vacuum device produces oxygen-depleted water from the second flow of said nature water that was transferred by the uptake conduit.

3. The apparatus of claim 2 further comprising a flow control mechanism to shut off, on demand, the second flow of said nature water in the uptake conduit.

4. The apparatus of claim 2 wherein the second flow of said nature water in the uptake conduit includes said first flow of the oxygen-depleted water that flowed through the water conduit.

5. The apparatus of claim 1 wherein the vacuum device receives water from a source external to the water conduit.

6. The apparatus of claim 1 further comprising a flushing conduit connected to the vacuum device, said flushing conduit adapted to accept a second flow of the oxygen-depleted water from the vacuum device, said flushing conduit also adapted to provide the intake opening of the water conduit with said second flow of said oxygen-depleted water.

7. The apparatus of claim 1 wherein the vacuum device further comprises:

a vacuum chamber having a total volume, said vacuum chamber filled with water to about 65% by volume of its total volume.

8. The apparatus of claim 1 wherein the vacuum device produces oxygen-depleted water with a concentration of dissolved oxygen that is below a level sufficient to support the survival of macrofoulers and the larvae thereof.

9. The apparatus of claim 8 wherein the pressure of the vacuum device is kept above about 21 inches of mercury when there is no demand for said first flow of said nature water through the water conduit.

10. The apparatus of claim 8 wherein the vacuum device reduces the concentration of dissolved oxygen in the oxygen-depleted water to less than about 50% of the saturated dissolved oxygen concentration at ambient temperature.

11. An apparatus for controlling macrofoulers and larvae thereof in an on-demand water conduit, said apparatus comprising:

a water conduit having an intake opening located in a source of nature water containing macrofoulers and larvae thereof, a first orifice, and a second orifice, said water conduit adapted to conduct a first flow of said nature water, on demand, in a first direction to a predetermined location to be discharged;

a vacuum device connected to an intermediate portion of said water conduit between said intake opening and said predetermined location where said first flow of said nature water is adapted to be discharged, said vacuum device having an intake orifice, a discharge orifice, and a flushing orifice, said vacuum device adapted to receive water through the intake orifice, said vacuum device adapted to produce oxygen-depleted water from the water received through the intake orifice, said vacuum device adapted to provide a first flow of said oxygen-depleted water through the discharge orifice to the second orifice of the water conduit when no demand exists for said first flow of said nature water in the first direction, said vacuum device also adapted to provide a second flow of said oxygen-depleted water through the flushing orifice when no demand exists for said first flow of said nature water in the first direction;

a flushing conduit connected to the vacuum device, said flushing conduit adapted to accept said second flow of the oxygen-depleted water from the flushing orifice of the vacuum device, said flushing conduit also adapted to provide the intake opening of the water conduit with said second flow of said oxygen-depleted water;

an uptake conduit connected between the water conduit and the vacuum device, said uptake conduit adapted to transfer a second flow of said nature water from the first orifice of the water conduit to the intake orifice of the vacuum device; and a flow control mechanism to shut off, on demand, the second flow of said nature water in the uptake conduit;

whereby, when no demand exists for said first flow of said nature water in the first direction, the vacuum device produces said first flow of said oxygen-depleted water that circulates through the second orifice of the water conduit, through the water conduit in direction opposite the first direction, through the first orifice of the water conduit, and then through the uptake conduit back to the intake orifice of the vacuum device; and wherein, when there is a demand for said first flow of said nature water through said water conduit, said first flow of said nature water is not diverted through said vacuum device.

12. The apparatus of claim 11 wherein the vacuum device further comprises:

a vacuum chamber having a total volume, said vacuum chamber filled with water to about 65% by volume of its total volume.

13. The apparatus of claim 11 wherein the vacuum device produces oxygen-depleted water with a concentration of dissolved oxygen that is below a level sufficient to support the survival of macrofoulers and the larvae thereof.

14. The apparatus of claim 13 wherein the pressure of the vacuum device is kept above about 21 inches of mercury when there is no demand for said first flow of said nature water in the first direction.

15. The apparatus of claim 13 wherein the vacuum device reduces the concentration of dissolved oxygen in the oxygen-depleted water to less than about 50% of the saturated dissolved oxygen concentration at ambient temperature.

16. An apparatus for controlling macrofoulers and larvae thereof in an on-demand water conduit, said apparatus comprising:

a water conduit having an intake opening located in a source of nature water containing macrofoulers and larvae thereof, said intake opening for receiving a flow of said nature water, said water conduit comprising means to conduct said flow of said nature water, on demand, in a first direction;

a vacuum device adapted to receive water, said vacuum device adapted to produce oxygen-depleted water from the received water, said vacuum device comprising means to provide a first flow of the oxygen-depleted water to the water conduit in a direction opposite the first direction when no demand exists for said flow of said nature water in the first direction; and a flushing conduit connected to the vacuum device, said flushing conduit adapted to accept a second flow of the oxygen-depleted water from the vacuum device, said flushing conduit also adapted to provide the intake opening of the water conduit with said second flow of said oxygen-depleted water.

17. A method for controlling macrofoulers and larvae thereof in a water conduit having an intake opening located in a source of nature water containing macrofoulers and larvae thereof, a first orifice, and a second orifice, said water conduit adapted to conduct a first flow of said nature water on demand, said method comprising the steps of:

diverting a second flow of said nature water from the intake opening through the first orifice of the water conduit when no demand exists for said first flow of said nature water through the water conduit;

subjecting the second flow of said nature water that was diverted through the first orifice of the water conduit to a vacuum such that the concentration of dissolved oxygen in the water is reduced to a level that is insufficient to support the survival of macrofoulers and the larvae thereof; and circulating a first flow of the water that was subjected to the vacuum through the second orifice of the water conduit and then through a desired section of the water conduit;

wherein, when there is a demand for said first flow of said nature water through said water conduit, said first flow of said nature water is not subjected to said vacuum.

18. The method of claim 17 wherein:

the first flow of said water that was subjected to the vacuum is circulated through the second orifice of the water conduit, through the water conduit in direction opposite the first direction, and then back through the first orifice of the water conduit.

19. The method of claim 17 wherein the vacuum device reduces the concentration of dissolved oxygen in the water to less than about 50% of the saturated dissolved oxygen concentration at ambient temperature.

20. The method of claim 17 wherein the pressure of the vacuum is kept above about 21 inches of mercury when there is no demand for said first flow of said nature water through the water conduit.

21. The method of claim 17 further comprising the step of providing the intake opening of the water conduit with a second flow of the water that was subjected to the vacuum.

* * * * *

UNITED STATES PATENT AND TRADEMARK OFFICE
CERTIFICATE OF CORRECTION

PATENT NO. : 5,948,279
DATED : September 7, 1999
INVENTOR(S) : Chang et al.

It is certified that error appears in the above-identified patent and that said Letters Patent is hereby corrected as shown below:

In column 1, line 53, please delete the word "*Limnopema*" and replace it with -- *Limnoperna* --.

In column 8, lines 60 and 61, please delete the phrase "Hanna Instruments Limited in Bedfordshire, England" and replace it with the phrase -- Omega Engineering Incorporated in Stamford, Conn. --.

In column 10, line 53, please delete the word "Bedfrodshire" and replace it with -- Bedfordshire --.

Signed and Sealed this

First Day of August, 2000

Attest:

Q. TODD DICKINSON

*Attesting Officer*        *Director of Patents and Trademarks*